(12) United States Patent
Yamada

(10) Patent No.: US 9,171,410 B2
(45) Date of Patent: Oct. 27, 2015

(54) MOBILE TERMINAL DEVICE, AUTHENTICATION SYSTEM, AUTHENTICATION METHOD, PROGRAM, AND INTEGRATED CIRCUIT

(71) Applicant: Panasonic Intellectual Property Management Co., Ltd., Osaka (JP)

(72) Inventor: Kazunori Yamada, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 192 days.

(21) Appl. No.: 13/990,138

(22) PCT Filed: Oct. 29, 2012

(86) PCT No.: PCT/JP2012/006924
§ 371 (c)(1),
(2) Date: May 29, 2013

(87) PCT Pub. No.: WO2013/073120
PCT Pub. Date: May 23, 2013

(65) Prior Publication Data
US 2014/0062650 A1 Mar. 6, 2014

(30) Foreign Application Priority Data
Nov. 15, 2011 (JP) .................. 2011-249615

(51) Int. Cl.
*G08B 13/14* (2006.01)
*H04Q 5/22* (2006.01)
(Continued)

(52) U.S. Cl.
CPC ............ *G07C 9/00007* (2013.01); *G06F 21/34* (2013.01); *H04M 1/72572* (2013.01); *H04M 1/72577* (2013.01)

(58) Field of Classification Search
USPC ........... 340/572.1, 8.1, 5.2, 10.1, 10.5, 568.1; 709/223; 705/8, 9, 400, 18, 19, 34, 39
See application file for complete search history.

(56) References Cited

U.S. PATENT DOCUMENTS 6,058,309 A * 5/2000 Huang et al. .................. 455/433
6,058,311 A * 5/2000 Tsukagoshi ................ 455/435.1
(Continued)

FOREIGN PATENT DOCUMENTS

| JP | 05-197886 | 8/1993 |
|---|---|---|
| JP | 2002-247223 | 8/2002 |

(Continued)

OTHER PUBLICATIONS

International Search Report issued Jan. 15, 2013 in International (PCT) Application No. PCT/JP2012/006924.

*Primary Examiner* — Fekadeselassie Girma
(74) *Attorney, Agent, or Firm* — Wenderoth, Lind & Ponack, L.L.P.

(57) ABSTRACT

A mobile terminal device which a user carries includes: an entry determining unit for determining entry of the mobile terminal device in a residential area; an authentication information storage unit for storing authentication information indicating multiple authentication actions performed by the user carrying the mobile terminal device and an authentication order indicating an order of the authentication actions to be performed; an authentication processing unit for processing for authentication of the user by determining, based on the authentication information, whether or not the user has performed the authentication actions in the authentication order after the mobile terminal device enters the residential area; and an alarm processing unit for indicating a failure of the authentication when the result of the processing for the authentication is the failure.

6 Claims, 13 Drawing Sheets

(51) Int. Cl.
*G06F 15/173* (2006.01)
*G06Q 20/00* (2012.01)
*G07C 9/00* (2006.01)
*G06F 21/34* (2013.01)
*H04M 1/725* (2006.01)

(56) References Cited

U.S. PATENT DOCUMENTS

| | | | |
|---|---|---|---|
| 7,114,175 B2 * | 9/2006 | Lahteenmaki | 726/4 |
| 7,238,156 B1 * | 7/2007 | Adamczyk | 600/300 |
| 7,627,505 B2 | 12/2009 | Yoshida et al. | |
| RE42,996 E * | 12/2011 | Hyun et al. | 370/338 |
| 8,209,264 B2 * | 6/2012 | Wakabayashi et al. | 705/76 |
| 8,280,351 B1 * | 10/2012 | Ahmed et al. | 455/411 |
| RE43,789 E * | 11/2012 | Hyun et al. | 370/338 |
| RE44,620 E * | 12/2013 | Hyun et al. | 370/338 |
| 8,817,712 B2 * | 8/2014 | Shin et al. | 370/329 |
| 8,839,386 B2 * | 9/2014 | Gilboy | 726/7 |
| 8,869,248 B2 * | 10/2014 | Moosavi et al. | 726/5 |
| 2002/0061748 A1 * | 5/2002 | Nakakita et al. | 455/435 |
| 2003/0158815 A1 | 8/2003 | Yoshida et al. | |
| 2003/0181215 A1 * | 9/2003 | Cromer et al. | 455/515 |
| 2003/0207683 A1 * | 11/2003 | Lempio et al. | 455/422.1 |
| 2003/0233458 A1 * | 12/2003 | Kwon et al. | 709/227 |
| 2004/0035925 A1 * | 2/2004 | Wu et al. | 235/380 |
| 2005/0099262 A1 * | 5/2005 | Childress et al. | 340/5.6 |
| 2005/0110610 A1 * | 5/2005 | Bazakos et al. | 340/5.82 |
| 2005/0141468 A1 * | 6/2005 | Kim et al. | 370/338 |
| 2006/0046689 A1 * | 3/2006 | Kim | 455/406 |
| 2006/0082439 A1 * | 4/2006 | Bazakos et al. | 340/5.82 |
| 2007/0021194 A1 * | 1/2007 | Aida | 463/29 |
| 2007/0113092 A1 * | 5/2007 | Nishida et al. | 713/171 |
| 2007/0126583 A1 * | 6/2007 | Maniwa et al. | 340/572.2 |
| 2007/0167175 A1 * | 7/2007 | Wong et al. | 455/456.5 |
| 2007/0195989 A1 * | 8/2007 | Tsubata et al. | 382/100 |
| 2008/0191009 A1 * | 8/2008 | Gressel et al. | 235/382 |
| 2009/0207805 A1 * | 8/2009 | Zou | 370/331 |
| 2009/0239502 A1 * | 9/2009 | Dempo et al. | 455/411 |
| 2010/0073127 A1 * | 3/2010 | Fukushima | 340/5.6 |
| 2010/0093429 A1 * | 4/2010 | Mattice et al. | 463/25 |
| 2010/0117836 A1 * | 5/2010 | Seyed Momen et al. | 340/573.1 |
| 2010/0199339 A1 * | 8/2010 | Kageyama | 726/7 |
| 2010/0311427 A1 * | 12/2010 | Bouguen et al. | 455/446 |
| 2010/0328043 A1 * | 12/2010 | Jantunen et al. | 340/10.3 |
| 2011/0001635 A1 * | 1/2011 | Akens et al. | 340/936 |
| 2011/0081895 A1 * | 4/2011 | Ohashi | 455/414.1 |
| 2011/0104654 A1 * | 5/2011 | Eom et al. | 434/351 |
| 2011/0183666 A1 * | 7/2011 | Song | 455/432.1 |
| 2011/0221578 A1 * | 9/2011 | Sekiguchi et al. | 340/10.42 |
| 2012/0167170 A1 * | 6/2012 | Shi et al. | 726/2 |
| 2012/0218075 A1 * | 8/2012 | Hill | 340/5.61 |
| 2012/0218078 A1 * | 8/2012 | Hill | 340/5.82 |
| 2012/0221695 A1 * | 8/2012 | Rose et al. | 709/223 |
| 2012/0253974 A1 * | 10/2012 | Haikonen et al. | 705/26.41 |
| 2013/0046645 A1 * | 2/2013 | Grigg et al. | 705/26.1 |
| 2013/0122882 A1 * | 5/2013 | Patel et al. | 455/418 |

FOREIGN PATENT DOCUMENTS

| | | |
|---|---|---|
| JP | 2003-196566 | 7/2003 |
| JP | 2004-258845 | 9/2004 |
| JP | 2007-116318 | 5/2007 |
| JP | 2010-112002 | 5/2010 |
| JP | 2011-035855 | 2/2011 |

* cited by examiner

FIG. 5

| User ID | Authentication order | Authentication action | Authentication time period | Credibility degree |
|---|---|---|---|---|
| ID-001 | 1 | Move straight for two meters | Five seconds | 1 |
| | 2 | Turn 90 degrees | Three seconds | 1 |
| | 3 | Move straight for two meters | Five seconds | 1 |
| | 4 | Open and close microwave door | Ten seconds | 2 |
| | 5 | Touch microwave | Five seconds | 3 |
| | 6 | Shake mobile terminal up and down | Three seconds | 2 |

FIG. 6

| Credibility degree | Authentication action (Authentication order) | Sound at front door |
|---|---|---|
| 1 | 1, 2, 3, 4, 5, 6 | Long beep sound |
| 2 | 4, 5, 6 | Consecutive short beep sounds |
| 3 | 5 | Short beep sound once |

FIG. 7

| Obtained information ID | Route | Time | Appliance ID | Peripheral information | Most recent operation |
|---|---|---|---|---|---|
| 001 | NFC | 2000/08/05 15:15:45:100 | 01A | Microwave | Opening and closing of door |
| 001 | NFC | 2000/08/05 15:15:46:500 | 01A | Microwave | Opening and closing of door |
| 001 | NFC | 2000/08/05 15:15:47:300 | 01A | Microwave | Touch |
| 002 | wireless | 2000/08/05 15:15:55:200 | 02A | TV remote control | Power ON |
| 003 | wireless | 2000/08/05 15:15:55:200 | 02A | TV remote control | Volume adjustment |
| | | | | | |

MOBILE TERMINAL DEVICE, AUTHENTICATION SYSTEM, AUTHENTICATION METHOD, PROGRAM, AND INTEGRATED CIRCUIT

TECHNICAL FIELD

The present invention relates to a method for detecting an unauthorized intrusion in a building, and a device which is included in a mobile terminal and detects whether or not a person inside the building carrying the mobile terminal is the unauthorized intruder, based on the change of the situation inside the building.

BACKGROUND ART

Recent home networks establish co-operations among audio-visual home appliances through the Internet Protocol (IP) connection in wireless networks including Ethernet (Registered) and a wireless local area network (LAN). In addition, these networks are acquiring functions for co-operating equipment items—the functions to let various equipment items connect with the networks—through a home energy management system (HEMS). The HEMS is capable of managing electricity consumption in view of environment issues and managing power source for equipment items (including home appliances) through remote control outside a building.

Some of the home network systems allow a co-operation between a mobile terminal, such as a smart phone, and indoor equipment items. Hence, in the future, these systems may allow a user to lock and unlock his or her house doors with, for example, his or her mobile terminal. The user, however, takes the mobile terminal with him or her. Hence, out of the house, the user could have such problems as misplacing the mobile terminal or having the mobile terminal stolen. Consequently, an assumed case is that a malicious third party uses the stolen mobile terminal to intrude the user's house.

As a counter-measure against such a case, the user could create a password when turning on and off the mobile terminal and activating an application to lock and unlock a house door. The measure, however, is very troublesome and inconvenient for a user who uses the mobile terminal every day. One of exemplary techniques to solve such a problem is disclosed in Patent Literature 1.

CITATION LIST

Patent Literature

[PTL 1]
Japanese Unexamined Patent Application Publication No. 2002-247223

SUMMARY OF INVENTION

Technical Problem

For the technique disclosed in Patent Literature 1, however, it is difficult to ensure to achieve the effects disclosed therein in view of energy conservation and operating time.

The present invention is conceived in view of the above problem and aims to provide a mobile terminal device, an authentication system, and an authentication method which are capable of saving energy, operating for a long period of time, and fully detecting an unauthorized intrusion.

Solution to Problem

In order to achieve the above aim, a mobile terminal device according to an aspect of the present invention is one for a user to carry. The mobile terminal device includes: an entry determining unit which determines entry of the mobile terminal device in a target area; an authentication information storage unit which stores authentication information which indicates an authentication action performed for authentication by the user carrying the mobile terminal device; an authentication processing unit which executes processing for authentication of the user by determining whether or not the user performs the authentication action between when the entry determining unit determines that the mobile terminal device enters the target area and when a predetermined time elapses, the determination being made based on a comparison between an activity performed by the user and the authentication action indicated in the authentication information; and an alarm processing unit which, when a result of the processing for the authentication is a failure, indicates the failure of the authentication.

According to the structure, the authentication processing unit executes processing for authentication of the user by determining whether or not the activity of the user carrying the mobile terminal device is a previously-set authentication action. Then, in the case where the result of the processing for the authentication executed by the authentication processing unit is a failure; that is the case where the determination result shows that the user fails to perform the previously-set activity between when the user enters the target area and when the predetermined time period elapses, the alarm processing unit provides a notification of an authentication failure indicating the failure of the authentication.

Thus, even though an illegitimate user maliciously obtains the mobile terminal device, an authentication action performed after the user has entered the target area makes it possible to determine whether or not the user is the legitimate owner of the mobile terminal device. In the case where the result of the determination shows an authentication failure, the mobile terminal device executes the alarm processing, which successfully assures the security in the house. Hence, the present invention allows the mobile terminal device alone to detect unauthorized intrusion. Consequently, the present invention makes it possible to detect unauthorized intrusion with a simple structure without depending on a monitoring unit such as a camera.

It is noted that, as well as in the form of the mobile terminal device described above, the present invention can also be implemented in a form of an authentication system including the above mobile terminal device and the peripheral. Moreover, the present invention can also be implemented in a form of an authentication method including the operation of characteristic constituent elements of mobile terminal device as steps. Furthermore, the present invention can also be implemented in the form of a computer program to cause a computer to execute the authentication method. Such a program may be distributed via a recording medium such as a CD-ROM and a transmission medium such as the Internet. In addition, the present invention can also be implemented in a form of an integrated circuit which executes processing of each processing unit.

Advantageous Effects of Invention

As described above, a mobile terminal device, an authentication system, and an authentication program according to

BRIEF DESCRIPTION OF DRAWINGS

FIG. 1 depicts a functional block diagram of an authentication system according to embodiments of the present invention.
FIG. 2 depicts a functional block showing how a mobile terminal device according to Embodiment 1 of the present invention executes processing for detecting unauthorized intrusion.
FIG. 3 depicts a block diagram showing a structure of a peripheral for the unauthorized intrusion detection processing.
FIG. 4 illustrates a specific example of an authentication action of a user.
[FIG. 5]
FIG. 5 depicts a table showing authentication information stored in an authentication information storage unit.
[FIG. 6]
FIG. 6 depicts a table which associates, with one another, a kind of sound produced from a sound producing unit in a notifying unit, a credibility degree, and an authentication action corresponding to the credibility degree.
[FIG. 7]
FIG. 7 shows an exemplary result that how an activity of a user actually carrying the mobile terminal device is recognized as an authentication action by each of processing units in the mobile terminal device.
FIG. 8 depicts a flowchart showing a flow of how the mobile terminal device according to Embodiment 1 authenticates a user.
FIG. 9 depicts a flowchart showing a flow of how the mobile terminal device according to Embodiment 1 authenticates the user.
FIG. 10 depicts a flowchart showing a flow of how the mobile terminal device according to Embodiment 1 authenticates the user.
FIG. 11 depicts a flowchart showing a flow of how the mobile terminal device according to Embodiment 1 authenticates the user.
FIG. 12 depicts a flowchart showing a flow of how the mobile terminal device according to Embodiment 1 authenticates the user.
FIG. 13 depicts a flowchart showing a flow of how the mobile terminal device according to Embodiment 1 authenticates the user.
FIG. 14 depicts a flowchart showing a flow of processing executed when a near field communication (NFC) processing unit detects a touch operation.
FIG. 15 depicts a flowchart showing a flow of processing executed when a wireless LAT processing unit obtains user operation information sent to a peripheral.
FIG. 16 depicts a functional block showing how a mobile terminal device according to Embodiment 2 of the present invention executes unauthorized intrusion detection processing.

DESCRIPTION OF EMBODIMENTS

Figure 1:
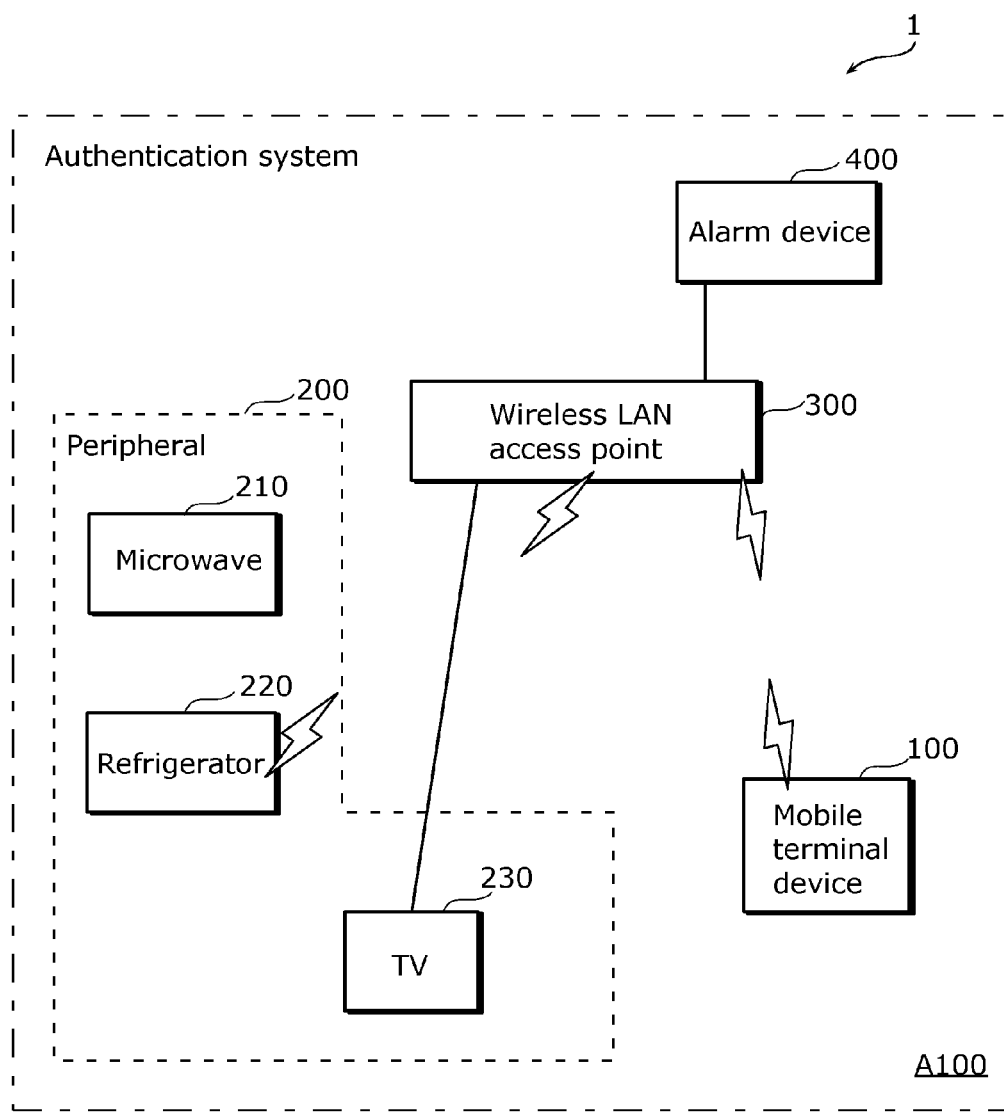
[FIG. 1]

[Insight as the Basis of the Present Invention]

The inventor has found out that the system and method for monitoring by utilizing cellular phone in Background Art has the problems below.

PTL 1 discloses (i) a mobile terminal including a monitoring unit causing a sub unit included therein to receive sounds and images, and (ii) a monitoring system which works with a monitoring center device through electronic mail and a data transmitting unit to monitor a building and react to an intruder into the building and an emergency happened when a user goes out of the building. Such a mobile terminal and a system can detect unusual conditions around the mobile terminal without creating a password.

In order to achieve a certain monitoring capability in a conventional technique such as the one in PTL 1, however, a unit is indispensable to obtain sounds and images required for the monitoring capability of the mobile terminal. Furthermore, since the mobile terminal has to operate sufficiently long, the mobile terminal inevitably consumes much energy. Hence, operating only on a battery of the mobile terminal imposes a limitation on its operating time. Moreover, having the unit to obtain sounds and images required for the monitoring of the mobile terminal results in an increase in the cost of the mobile terminal, and tends to cause a privacy problem because the unit obtains sounds and images around the user.

In order to achieve the above aim, a mobile terminal device according to an implementation of the present invention is one for a user to carry. The mobile terminal device includes: an entry determining unit which determines entry of the mobile terminal device in a target area; an authentication information storage unit which stores authentication information which indicates an authentication action performed for authentication by the user carrying the mobile terminal device; an authentication processing unit which executes processing for authentication of the user by determining whether or not the user performs the authentication action between when the entry determining unit determines that the mobile terminal device enters the target area and when a predetermined time elapses, the determination being made based on a comparison between an activity performed by the user and the authentication action indicated in the authentication information; and an alarm processing unit which, when a result of the processing for the authentication is a failure, indicates the failure of the authentication.

According to the structure, the authentication processing unit executes processing for authentication of the user by determining whether or not the user carrying the mobile terminal device acts as a previously-set authentication action. Then, in the case where the result of the processing for the authentication executed by the authentication processing unit is a failure; that is the case where the determination result shows that the user fails to perform the previously-set activity between when the user enters the target area and when the predetermined time period elapses, the alarm processing unit provides a notification of an authentication failure indicating the failure of the authentication.

Thus, even though an illegitimate user maliciously obtains the mobile terminal device, an authentication action performed after the user has entered the target area makes it possible to tell whether or not the user is the legitimate owner of the mobile terminal device. In the case where the result of the determination shows an authentication failure, the mobile terminal device executes the alarm processing, which successfully assures the security in the house. Hence, the present invention allows the mobile terminal device alone to detect unauthorized intrusion. Consequently, the present invention makes it possible to detect unauthorized intrusion with a simple structure without a monitoring unit such as a camera. Moreover, the processing for the authentication is executed within a predetermined time period. This feature makes it possible to detect unauthorized intrusion, eliminating the need for always monitoring the house. Such a monitoring feature contributes to an improvement in efficiency in energy consumption for the processing of authentication.

The authentication information storage unit may store, as the authentication information, information which indicates authentication actions including the authentication action and performed by the user and an authentication order indicating an order of the authentication actions to be performed, and the authentication processing unit may execute the processing for the authentication of the user by determining whether or not the user performs the authentication actions in the authentication order between when the entry determining unit determines that the mobile terminal device enters the target area and when a predetermined time elapses, the determination being made based on a comparison between at least one activity performed by the user and the authentication actions indicated in the authentication information.

Such a feature makes it possible to determine whether or not the user is an authorized user based on whether or not the user performs multiple authentication actions in an authentication order, which contributes to assured execution of the processing for the authentication of the user.

The authentication information storage unit may store, as the authentication information, information in which each of the authentication actions is associated with a corresponding one of authentication time periods each indicating a length of time it takes for the user to finish a corresponding one of the authentication actions, and the authentication processing unit may execute the processing for the authentication by determining whether or not the authentication actions have been performed by the user within the respective authentication time periods.

Such a feature makes it possible to perform processing for authentication by determining whether or not multiple authentication actions have been performed by the user within authentication time periods each corresponding to one of the authentication actions, which contributes to assured execution of the processing for the authentication of the user.

The authentication information storage unit may store the authentication information indicating an operation by the user of a peripheral as the authentication action, the mobile terminal device may further include a peripheral information receiving unit which receives operation information from the peripheral via a wireless network, the operation information indicating the operation by the user of the peripheral, and the authentication processing unit may execute the processing for the authentication of the authentication action indicated in the operation information received by the peripheral information receiving unit.

Such a feature allows an operation by the user of the peripheral to be defined as an authentication action, which contributes to increasing the number of the authentication actions. Consequently, the feature assures the execution of the processing for authentication of the user.

The authentication information storage unit may store the authentication information indicating, as the authentication action, a touch operation by the user touching with the mobile terminal device a tag provided to a previously-set position within the target area or to a peripheral, the mobile terminal device may further include a near field communication (NFC) processing unit which, when the user performs the touch operation, receives position information indicating a predetermined position within the target area or peripheral information indicating the peripheral, the position information and the peripheral information being associated with the tag, and the authentication processing unit may, by determining that the touch operation has been performed by the user, execute the processing for the authentication of the authentication action indicated with the touch operation, the determination being made based on the position information or the peripheral information received by the NFC processing unit, and the touch operation being a touch with the mobile terminal device the tag provided either to the predetermined position indicated in the position information or to the peripheral indicated in the peripheral information.

Such a feature allows the touch operation to the tag to be defined as an authentication action, which contributes to increasing the number of the authentication actions. Consequently, the feature assures the execution of the processing for authentication of the user.

The authentication information storage unit may store the authentication information indicating an operation by the user of a peripheral as the authentication action, the NFC processing unit may receive most-recent operation information, along with the peripheral information, from the peripheral, the most-recent operation information indicating a most-recent operation by the user of the peripheral before the touch operation, and the authentication processing unit may execute the processing for the authentication of an authentication action indicated in the most-recent operation information and defined as a most-recent authentication action before the touch operation.

Such a feature makes it possible to store into the storage unit the most-recent authentication action before a touch operation, which eliminates the need for a peripheral to be connected to a wireless network.

The mobile terminal device may include an operation receiving unit which receives an operation by the user. The authentication information storage unit may store the authentication information indicating the operation by the user of the operation receiving unit as the authentication action, and the authentication processing unit may execute the processing for the authentication of the operation received by the operation receiving unit.

The mobile terminal device may include: an acceleration sensor; an angular velocity sensor; a geometric sensor; a terminal orientation deriving unit which derives terminal orientation information, indicating an orientation of the mobile terminal device, from acceleration information detected by the acceleration sensor, angular velocity information detected by the angular velocity sensor, and geometric information detected by the geometric sensor; a terminal traveling condition deriving unit which derives terminal traveling condition information, indicating a traveling distance and a traveling direction of the mobile terminal device, from the acceleration information detected by the acceleration sensor and the terminal orientation information derived by the terminal orientation deriving unit; a position estimating unit which estimate current position information indicating a current position of the mobile terminal device, based on the terminal traveling condition information and previous position information indicating a position of the mobile terminal device in a previous estimation; and a traveling route deriving unit which derives traveling route information, indicating a route which the user carrying the mobile terminal device travels, from the previous position information and the current position information estimated by the position estimating unit. The authentication action may include the traveling route information, and the authentication processing unit may execute the processing for the authentication of the authentication action indicated in the traveling route information.

Such features allow a traveling route to be defined as an authentication action, which contributes to increasing the number of the authentication actions. Consequently, the feature assures the execution of the processing for authentication of the user.

The mobile terminal device may include: an acceleration sensor; a walking characteristics deriving unit which derives walking characteristics information, indicating walking characteristics of the user, from acceleration information detected by the acceleration sensor; a complex degree determining unit which determines a complex degree of the processing for the authentication performed by the authentication processing unit based on the walking characteristics information derived by the walking characteristics deriving unit and found within an immediately-before-entry time period which is set immediately before the user enters the target area; and a notifying unit which aurally or visually notifies the user of complex degree information corresponding to the complex degree determined by the complex degree determining unit. The authentication information storage unit may previously store the authentication information corresponding to the complex degree, of the processing for the authentication, determined by the complex degree determining unit, and the authentication processing unit may execute the processing for the authentication according to the authentication information corresponding to the complex degree, of the processing for the authentication, determined by the complex degree determining unit.

Such a feature makes it possible to determine, based on walking characteristics of a user who is about to enter the target area, a complex degree of processing for authentication of the user, and executes processing for authentication corresponding to the determined complex degree. Hence, in the case where the walking characteristics of the user do not match the complex degree and thus the user is less likely to be the legitimate user, the feature makes it possible to increase the complex degree of the processing for the authentication. This feature assures the execution of the processing for authentication of the user.

It is noted that, as well as in the form of the mobile terminal device described above, the present invention can also be implemented in a form of an authentication system including the above mobile terminal device and the peripheral. Moreover, the present invention can also be implemented in a form of an authentication method including the operation of characteristic constituent elements of the mobile terminal device as steps. Furthermore, the present invention can also be implemented in the form of a computer program to cause a computer to execute the authentication method. Such a program may be distributed via a recording medium such as a CD-ROM and a transmission medium such as the Internet. In addition, the present invention can also be implemented in a form of an integrated circuit which executes processing of each processing unit.

Described hereinafter are embodiments of the present invention, with reference to the drawings. It is noted that any of the embodiments below is a specific example of the present invention. The numerical values, shapes, materials, constituent elements, arrangement positions and connecting schemes of the constitutional elements, steps, and an order of steps all described in the embodiments are examples, and shall not be defined as they are. The present invention shall be defined only by claims. Hence, among the constitutional elements in the embodiments, those not described in an independent claim representing the most generic concept of the present invention are not necessarily required to achieve the objects of the present invention; however, such constituent elements are introduced to implement a preferable form of the present invention.

[Embodiment 1]

FIG. 1 shows an exemplary structure of an authentication system 1 according to Embodiment 1 of the present invention. As shown in FIG. 1, the authentication system 1 includes: a mobile terminal device 100, such as a smart phone; a peripheral 200, such as a microwave 210, a refrigerator 220, and a TV 230; a wireless LAN access point 300 which establishes a home network such as a wireless LAN and works as a hub, a router, and a wireless transmitter and receiver of radio waves of the wireless LAN; and an alarm device 400. The peripheral 200 included in the authentication system 1, such as the microwave 210, the refrigerator 220, and the TV 230, is placed in a target area—that is, for example, a residential area A100. In other words, the peripheral 200 is an equipment item such as a home appliance placed in a building. The peripheral 200 also includes an air conditioner, a phone, and a washing machine. The peripheral 200 is connected to the wireless LAN access point 300. In FIG. 1, the TV 230 has a wired connection to the wireless LAN access point 300 via an Ethernet cable. Each of the microwave 210 and the refrigerator 220, which is a peripheral 200 other than the TV 230, has a radio frequency identification (RFID) tag. In FIG. 1, the refrigerator 220 has a wireless connection to the wireless LAN access point 300. Furthermore, the alarm device 400 is placed, for example, in the residential area A100, and has a wired connection to the wireless LAN access point 300 via an Ethernet cable. It is noted that the alarm device 400 does not have to be placed in the residential area A100. The alarm device 400 may be connected to the wireless LAN access point 300 via the WWW. The mobile terminal device 100 has a wireless connection to the wireless LAN access point 300. Hence, in the authentication system 1, the wireless LAN access point 300 establishes a LAN for the user's home with the mobile terminal device 100, the TV 230, and the alarm device 400.

The authentication system 1 in Embodiment 1 executes processing for authentication for determining whether or not a user carrying the mobile terminal device 100 with him or her is a resident of the residential area A100 (house), by detecting the user entering the residential area A100, and then determining whether or not the user performs previously-set multiple authentication actions in a previously-set order (hereinafter referred to as "authentication order"). Then, in the case where the result of the processing for the authentication is a failure, (in other words, the user carrying the mobile terminal device 100 is not the authentic user), the authentication system 1 sets off the alarm device 400 as unauthorized intrusion detecting processing. The multiple authentication actions include the following as examples: traveling route information obtained based on a detected traveling route of the mobile terminal device 100 to show a traveling route of a user carrying the mobile terminal device 100; operation information showing an operation by the user of the peripheral 200 such as the TV 230 and the microwave 210; a touch operation by the user touching, with the mobile terminal device 100, a radio frequency identification (RFID) tag provided to a specific position of the peripheral 200 and the residential area A100; and an input by the user into an operation receiving unit 122 such as an input button of the mobile terminal device 100, an acceleration sensor 118, an angular velocity sensor 119, and a geometric sensor 120. Detailed hereinafter is alarm processing.

Figure 2:
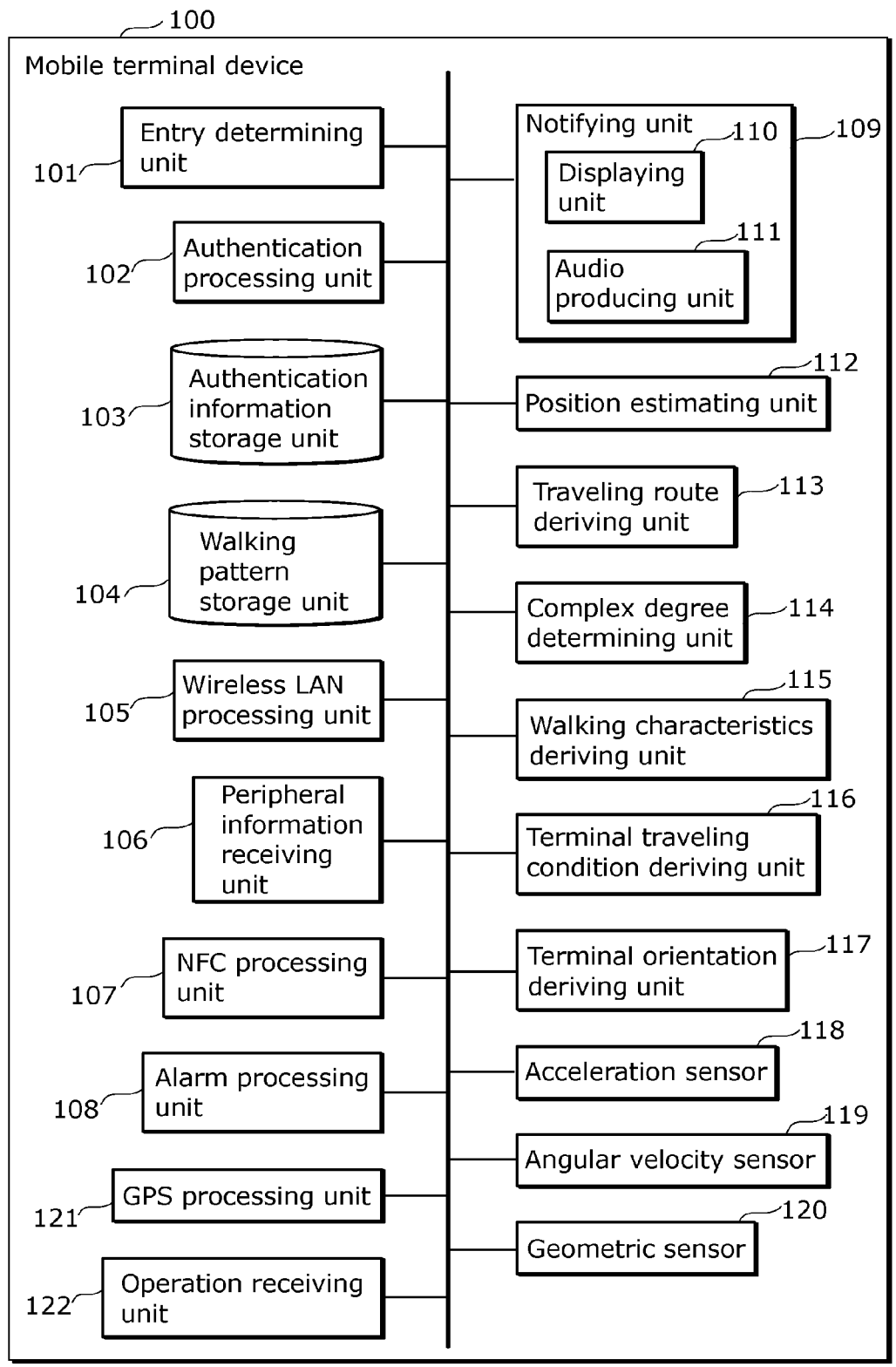
[FIG. 2]

FIG. 2 depicts a functional block showing how a mobile terminal device 100 executes unauthorized intrusion detection processing. As shown in FIG. 2, the mobile terminal device 100 according to Embodiment 1 of the present invention includes an entry determining unit 101, an authentication processing unit 102, an authentication information storage unit 103, a walking pattern storage unit 104, a wireless LAN processing unit 105, a peripheral information receiving unit 106, a near field communication (NFC) processing unit 107, an alarm processing unit 108, a notifying unit 109, a position estimating unit 112, a complex degree determining unit 114, a traveling route deriving unit 113, a walking characteristics deriving unit 115, a terminal traveling condition deriving unit 116, a terminal orientation deriving unit 117, the acceleration sensor 118, the angular velocity sensor 119, the geometric sensor 120, a global positioning system (GPS) processing unit 121, and the operation receiving unit 122.

The entry determining unit 101 determines the entry of the mobile terminal device 100 in the residential area A100 defined as a target area. Specifically, suppose the electronic lock of the front door of the residential area A100 (house) is locked and unlocked, for example, by a user passing the mobile terminal device 100 over the electronic lock. Here, the entry determining unit 101 detects that the electronic lock is unlocked when the mobile terminal device 100 is passed over the electronic lock.

The authentication processing unit 102 executes processing for authentication of the user carrying the mobile terminal device 100 by determining whether or not the user performs authentication actions in an authentication order between when the mobile terminal device 100 enters the residential area A100 defined as the target area and when a predetermined time period elapses, based on a comparison between activities performed by the user and the authentication actions indicated in authentication information (described later) Specifically, the authentication processing unit 102 executes the processing for authentication of the authentication actions indicated in the operation information received by the peripheral information receiving unit 106. Furthermore, based on position information (described later) or peripheral information (described later) received by the NFC processing unit 107, the authentication processing unit 102 determines that the user has performed a touch operation—the action of the user touching, with the mobile terminal device 100, an RFID tag provided to a previously-set position indicated in the position information or to the peripheral 200 indicated in the peripheral information. Then, the authentication processing unit 102 executes the processing for authenticating an authentication action indicated by the touch operation. Moreover, the authentication processing unit 102 executes the processing for authentication of an authentication action indicated in the most-recent operation information (described later) and defined as the most-recent authentication action before the touch operation. The authentication processing unit 102 executes the processing for authenticating an authentication action which the traveling route information indicates. The authentication processing unit 102 executes the processing for authentication according to authentication information depending on the complex degree of the processing of authentication determined by the complex degree determining unit 114. The authentication processing unit 102 executes the processing for authentication by determining whether or not multiple authentication actions have been performed by the user within respective authentication time periods each corresponding to one of the authentication actions. In other words, the authentication processing unit 102 has the sum of the authentication time periods set as the above-described predetermined time period. Here, each of the authentication time periods corresponds to one of the authentic activities that are subject to determination in the processing of authentication.

The authentication information storage unit 103 stores authentication information which indicates (i) multiple authentication actions performed by the user carrying the mobile terminal device 100 with him or her, and (ii) an authentication order indicating an order of the authentication actions to be performed. Moreover, the authentication information storage unit 103 further associates credibility degrees (described later) with the authentication actions and the authentication order. Here, the credibility degrees show complex degrees of processing of authentication determined by the complex degree determining unit 114. Furthermore, the authentication information storage unit 103 stores, as the authentication information, information in which each of the authentication actions is associated with a corresponding one of authentication time periods each indicating a length of time it takes for the user to finish a corresponding one of the authentication actions. For example, the authentication information storage unit 103 stores authentication information indicating, as authentication actions, (i) an operation by the user of the peripheral 200, a touch operation by the user touching with the mobile terminal device 100 a tag provided to a previously-set position within the residential area A100 or to the peripheral 200, (ii) an operation by the user of the operation receiving unit 122, and (iii) an operation by the user of each of the sensors 118 to 120 in the mobile terminal device 100. FIG. 5 depicts a table showing authentication information stored in the authentication information storage unit 103. As shown in FIG. 5, for example, the authentication information storage unit 103 stores the authentication information in association with a user ID for identifying the user, the authentication order, the authentication actions, the authentication time periods, and the credibility degrees.

Here, the user ID is a code for identifying the mobile terminal device 100. In FIG. 5, the user ID of the authentication information is only ID-001. Instead, the authentication information storage unit 103 may store a different piece of authentication information for each user ID.

The authentication order indicates the order of the authentication actions to be performed. Used for the processing of authentication is whether or not each of the authentication actions is performed as indicated in the authentication order. In other words, the processing for authentication is executed based on the determination whether or not the user has performed the authentication actions in the authentication information according to the order.

An authentication time period is counted when, for example, the user unlocks the electronic lock of the front door and the entry determining unit 101 has determined that the mobile terminal device 100 has entered the residential area A100 defined as the target area (hereinafter referred to as "after the start of processing for authentication"). The authentication processing unit 102 determines whether or not an authentication action is performed within the authentication time period. The authentication time period is used for the processing for authentication. In addition, an authentication time period to be used in determining the second authentication action or later is the sum of the authentication time periods for the authentication actions authenticated by the time of the determination. Then, the authentication time period in authenticating the authentication action is counted after the start of processing for authentication. In other words, processing for authentication for the first authentication action in the authentication order is executed within five seconds after the start of the processing for authentication. Processing for authentication for the second authentication action in the authentication order is executed within eight seconds (five seconds+three seconds) after the start of the processing for authentication. Processing for authentication for the third authentication action in the authentication order is executed within 13 seconds (five seconds+three seconds+five seconds) after the start of the processing for authentication.

The credibility degrees are determined based on the complex degrees of the processing for authentication determined by the after-described complex degree determining unit 114. A lower credibility degree requires more authentication actions to be performed for the processing for authentication. A higher credibility degree requires fewer authentication actions to be performed for the processing for authentication. In other words, a lower user credibility degree predetermined by the complex degree determining unit 114 requires more authentication actions to be performed for the processing for authentication, which increases the complex degree of the processing for authentication. A higher user credibility degree requires fewer authentication actions for the processing for authentication, which decreases the complex degree of the processing for authentication. FIG. 5 shows exemplary authentication information for processing for authentication of the user. The credibility degree 1 of a low credibility degree requires the user to perform all the authentication actions in the authentication order of 1 to 6. The credibility degree 2 having a credibility degree higher than the credibility degree 1 requires the user to perform the authentication actions in the authentication order of 4 to 6. The credibility degree 3 having the highest credibility degree requires the user to perform only the authentication action in the authentication order of 5.

The walking pattern storage unit 104 stores a walking pattern characterizing how a legitimate user of the mobile terminal device 100 (in other words, a resident of the house) walks. The walking pattern is set for each user based on acceleration information detected by the acceleration sensor 118.

The wireless LAN processing unit 105 transmits and receives information on the LAN for the user's home via the wireless LAN access point 300. In Embodiment 1, the wireless LAN processing unit transmits and receives information to and from the TV 230 connected to the wireless LAN access point 300.

Through a wireless network, such as a wireless LAN, the peripheral information receiving unit 106 receives from the peripheral 200 (the TV 230) operation information included in the information received by the wireless LAN processing unit 105 and indicating that the user has operated the peripheral 200. It is noted that the operation indicated in the operation information and carried out by the user of the peripheral 200 is a kind of authentication action in the authentication information stored in the authentication information storage unit 103.

When the user performs a touch operation, the NFC processing unit 107 receives position information indicating a predetermined position within the residential area A100 defined as the target area or peripheral information indicating the peripheral 200. Each of the position information and the peripheral information is associated with a tag. Here, the "touch operation" is performed by the user touching with the mobile terminal device 100 an RFID tag provided to a previously-set position within the residential area A100 defined as the target area or to the peripheral 200. The "touch operation" is also a kind of authentication action in the authentication information stored in the authentication information storage unit 103. An exemplary touch operation in FIG. 5 is "Touch microwave" in the authentication order of 5. Furthermore, the NFC processing unit 107 receives from the peripheral 200 most-recent operation information as well as the peripheral information. Here, the "most-recent operation information" indicates an operation by the user of the peripheral 200 immediately before his or her touch operation. Exemplary most-recent operation information in FIG. 5 is "Open and close microwave door" in the authentication order of 4.

When the result of the processing for authentication executed by the authentication processing unit 102 is a failure, the alarm processing unit 108 indicates the failure of authentication. Specifically, when the authentication result is a failure, the alarm processing unit 108 informs the alarm device 400 of the failure of authentication via the wireless LAN access point 300 so that the alarm device 400 is set off.

The terminal orientation deriving unit 117 derives terminal orientation information, indicating an orientation of the mobile terminal device 100, from acceleration information detected by the acceleration sensor 118, angular velocity information detected by the angular velocity sensor 119, and geometric information detected by the geometric sensor 120.

The terminal traveling condition deriving unit 116 derives terminal traveling condition information, indicating the traveling distance and the traveling direction of the mobile terminal device 100, from the acceleration information detected by the acceleration sensor 118 and the terminal orientation information derived by the terminal orientation deriving unit 117.

The position estimating unit 112 estimates current position information indicating the current position of the mobile terminal device 100, based on the terminal traveling condition information and previous position information indicating the position of the mobile terminal device 100 in the previous estimation. It is noted that when estimating the current position information of the mobile terminal device 100, the position estimating unit 112 may previously set the position of the front door as a reference point of the start (X1, Y1, Z1) to be used for the position for the initial estimation. The reference point of the start is used by the entry determining unit 101 for determining that the mobile terminal device has entered the residential area A100. Instead of the above estimation, the position estimation unit 112 may estimate the first position of the user and a position of the user during his or her authentication action, based on a touch operation of the user to a previously-set RFID tag within the residential area A100 and to an RFID tag provided to the peripheral 200. Since the position estimating unit 112 can estimate the first position of the user and a position of the user during his or her authentication action, the position estimating unit 112 can estimate the next current position of the mobile terminal device 100 when the device moves from the current position.

The traveling route deriving unit 113 derives traveling route information, indicating the route that the user carrying the mobile terminal device 100 travels, from the previous position information and the current position information estimated by the position estimating unit 112. It is noted that the route indicated in the traveling route information and showing how the user carrying the mobile terminal device 100 has traveled is a kind of authentication action indicated in the authentication information stored in the authentication information storage unit 103. Exemplary traveling route information in FIG. 5 is authentication actions of the authentication order 1 to 3. The "route" here is, for example, a single kind of movement, such as moving straight, turning, ascending, and descending all included in a user's travel from the front door to the microwave. In other words, as shown in FIG. 5, a single route is each of the three kinds of movement of the user traveling from the front door to the microwave-moving straight for two meters, turning 90 degrees, and moving straight for two meters.

The walking characteristics deriving unit 115 derives walking characteristics information, indicating the walking characteristics of the user, from the acceleration information detected by the acceleration sensor 118.

The complex degree determining unit 114 determines a complex degree of the processing for authentication to be executed by the authentication processing unit 102 based on the walking characteristics information derived by the walking characteristics deriving unit 115 and found within a previously-set immediately-before-entry time period which is set immediately before the user enters the residential area A100 defined as the target area. It is noted that the complex degree determined by the complex degree determining unit 114 is previously stored in association with the authentication information stored in the authentication information storage unit 103. For example, the complex degree determining unit 114 determines the credibility degree of a user as follows: In the case where the determination result shows that the user's walking characteristics information derived by the walking characteristics deriving unit 115 is over 80% similar to previously-set walking characteristics information of the legitimate user, the complex degree determining unit 114 determines that the credibility degree of the user is 3; in the case where the determination result shows that the user's walking characteristics information derived by the walking characteristics deriving unit 115 is 50% to 80% similar to the previously-set walking characteristics information of the legitimate user, the complex degree determining unit 114 determines that the credibility degree of the user is 2; and in the case where the determination result shows that the user's walking characteristics information derived by the walking characteristics deriving unit 115 is less than 50% similar to the previously-set walking characteristics information of the legitimate user, the complex degree determining unit 114 determines that the credibility degree of the user is 1.

The notifying unit 109 includes a displaying unit 110 and the audio producing unit 111. When the result of an authentication executed by the alarm processing unit 108 is a failure, the notifying unit 109 receives a notification of the failure, and produces a loud sound from the audio producing unit 111 such as a speaker or displays a warning on the displaying unit 110 that the failure of authentication, in order to inform the people around the mobile terminal device 100 that the user carrying the mobile terminal device 100 is an unauthorized one. Furthermore, the notifying unit 109 aurally or visually notifies the user of complex degree information (described later) corresponding to a complex degree (credibility degree) determined by the complex degree determining unit 114. In other words, the notifying unit 109 may display the complex degree information on the displaying unit 110 or may produce the complex degree information from the audio producing unit 111 in a form of sound or voice.

FIG. 6 depicts a table which associates, with one another, a kind of sound produced from the audio producing unit 111 in the notifying unit 109, a credibility degree, and an authentication action corresponding to the credibility degree. In the case where the credibility degree determined by the complex degree determining unit 114 is 1 as shown in FIG. 6, a group of the above-described authentication actions in the authentication order of 1 to 6 are set as authentication actions to be used for processing for authentication. When the user unlocks the electronic lock of the front door using the mobile terminal device 100, the audio producing unit 111 of the mobile terminal device 100 produces a long beep sound. In the case where the credibility degree determined by the complex degree determining unit 114 is 2, the audio producing unit 111 of the mobile terminal device 100 produces consecutive short beep sounds when the user unlocks the front door. In the case where the credibility degree determined by the complex degree determining unit 114 is 3, the audio producing unit 111 of the mobile terminal device 100 produces a short beep sound once when the user unlocks the front door. By causing the audio producing unit 111 to produce a sound, the notifying unit 109 can announce a user's credibility degree determined by the complex degree determining unit 114 when the user unlocks the electronic lock of the front door with the mobile terminal device 100.

In FIG. 6, as a credibility degree determined by the complex degree determining unit 114 is lower, more authentication actions to be used for processing for authentication are assigned to the authentication action group to increase the complex degree of the processing for authentication. Instead of assigning more authentication actions to the authentication action group to increase the complex degree of the processing for authentication, the complex degree of one authentication action may be increased. For example, a time period for continuously shaking the mobile terminal 100 up and down—that is one of the authentication actions—may be set longer as the credibility degree determined by the complex degree determining unit 114 is lower. In this case, the complex degree is increased with a longer time period for continuing the authentication action.

The operation receiving unit 122 receives a user operation. In other words, the operation receiving unit 122 receives a user input to an input device, such as a touch sensor and an input button, included in the mobile terminal device 100.

Figure 3:
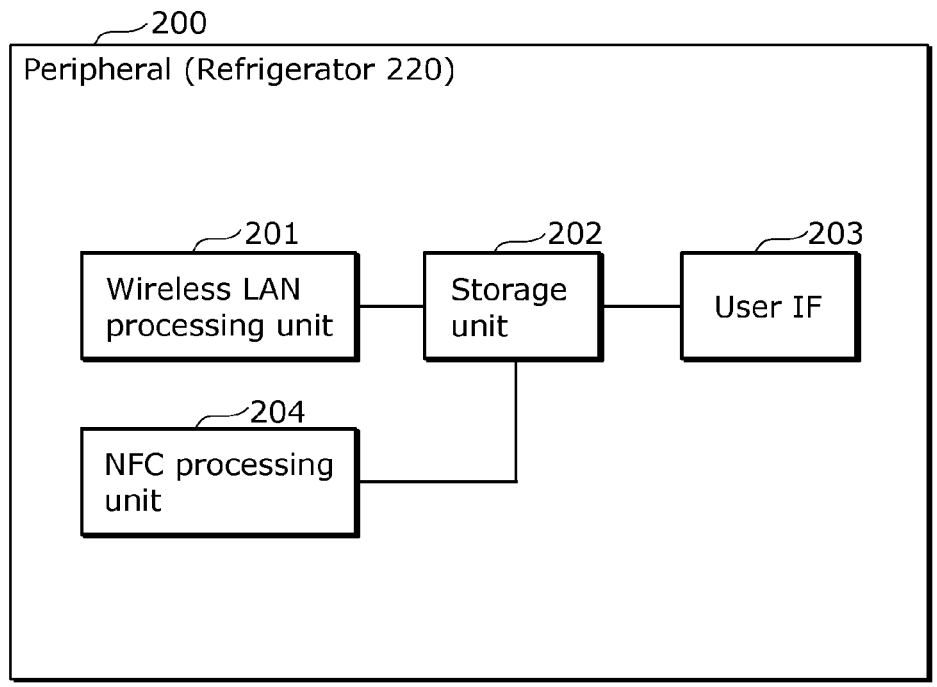
[FIG. 3]

FIG. 3 depicts a block diagram showing a structure of the peripheral 200, including the microwave 210, the refrigerator 220, and the TV 230, for unauthorized intrusion detection processing. As shown in FIG. 3, the peripheral 200 includes a wireless LAN processing unit 201, a storage unit 202, a user interface (IF) 203, and an NFC processing unit 204. The block diagram of the peripheral 200 in FIG. 3 shows the structure of the refrigerator 220 according to Embodiment 1.

The wireless LAN processing unit 201 establishes wireless communications for a LAN connection with the wireless LAN access point 300. The wireless LAN processing 201 transmits and receives data. The storage unit 202 temporarily stores the operation of the user IF 203 by the user as the user's most-recent operation information or operation information. In the case where the user IF 203 is the refrigerator 220, the user IF 203 detects the user's operations, such as opening and closing of a door, and setting a temperature in the refrigerator 220. In the case where the user IF 203 is the TV 230, the user IF 203 is, for example, a remote controller for the TV 230, and detects the user's operations of the buttons on the remote controller. In the case where the user IF 203 is the microwave 210, the user IF 203 is, for example, the user's operations of a button such as "Start" and of the door of the microwave 210. The NFC processing unit 204 is activated when the user passes the mobile terminal device 100 over the predetermined RFID tag of the refrigerator 220, and transmits to the mobile terminal device 100 the most-recent operation information stored in the storage unit 202, as well as the peripheral information on the refrigerator 220. Moreover, in the peripheral 200 including the wireless LAN processing unit 201, such as the refrigerator 220 according to Embodiment 1, the wireless LAN processing unit 201 may transmit temporarily stored user operation information to the mobile terminal device 100 via the wireless LAN access point 300. It is noted that the peripheral 200 may include at least one of the wireless LAN processing unit 201 and the NFC processing unit 204. The mobile terminal device 100 can obtain operation information indicating an operation of the peripheral 200 as far as the operation information is transmitted to the mobile terminal device 100 via the wireless LAN or most-recent operation information is transmitted to the mobile terminal device 100 via the NFC processing unit 204. In other words, whether the information is to be transmitted via the wireless LAN or the NFC may be selected as necessary.

Figure 4:
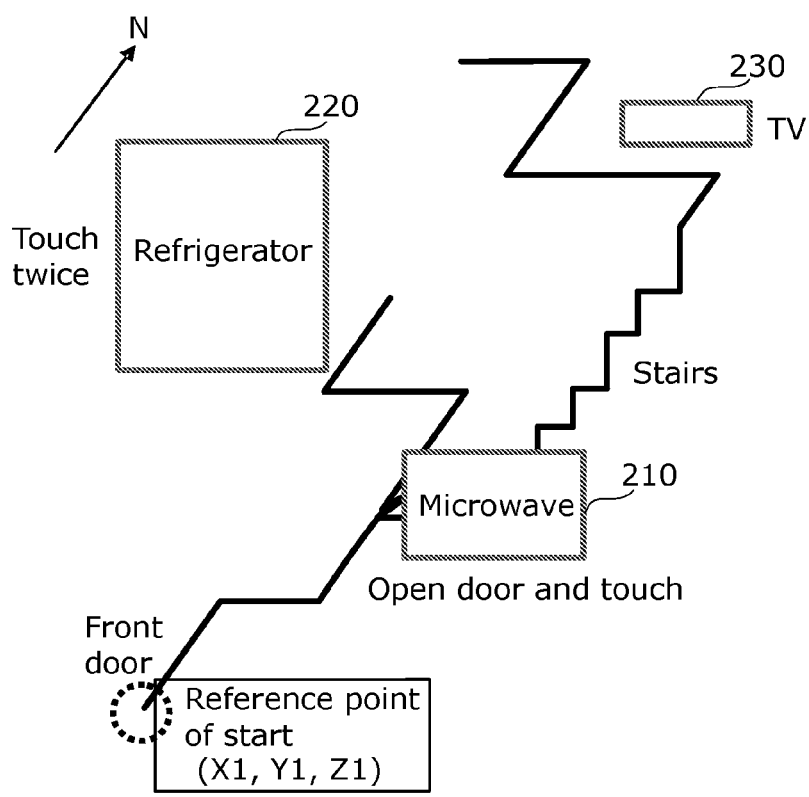
[FIG. 4]

FIG. 4 illustrates a specific example of an authentication 15, action of a user. The entry determining unit 101 of the mobile terminal device 100 detects that the user has entered the residential area A100 (i) from the information that the global positioning system processing unit 121, included in the mobile terminal device 100, has lost the position information of the mobile terminal device 100 and (ii) by the NFC processing unit 107 of the mobile terminal device 100 detecting that the electronic lock of the front door has been unlocked. In the present invention, authentication actions performed by the user after he or she enters the residential area A100 have been previously stored as seen in the authentication information (See FIG. 5) included in the authentication information storage unit 103. After entering the residential area A100, the user walks straight, turns right, walks straight a little further, and turns left. Then, the user finds the microwave 210. Here, by opening the door of the microwave 210, the user reads information from the microwave 210 through the NFC processing unit 107. Hence, as the most-recent operation information from the microwave 210, the mobile terminal device 100 obtains information that the user has opened the door.

Here, a processing procedure has been previously determined to tell that the user is authentic if, after opening the door, he or she reads information through the NFC processing unit 107 with touch operations performed twice on the refrigerator 220. After entering the building, the user performs an activity according to a predetermined processing procedure using the mobile terminal device 100. Such an activity identifies the user as a specific individual (authentic user). In the case where the user does not follow the processing procedure, the mobile terminal device 100 detects that the user of the mobile terminal device 100 is not a legitimate one (authentic user), and informs the alarm device 400 of the detected result to set off the alarm device 400. Hence, the mobile terminal device detects an unauthorized intrusion into the residential area A100 by an unauthorized user who is not an authentic one.

FIG. 7 shows an exemplary result that how an activity of a user actually carrying the mobile terminal device 100 is recognized as an authentication action by each of processing units in the mobile terminal device.

Figure 12:
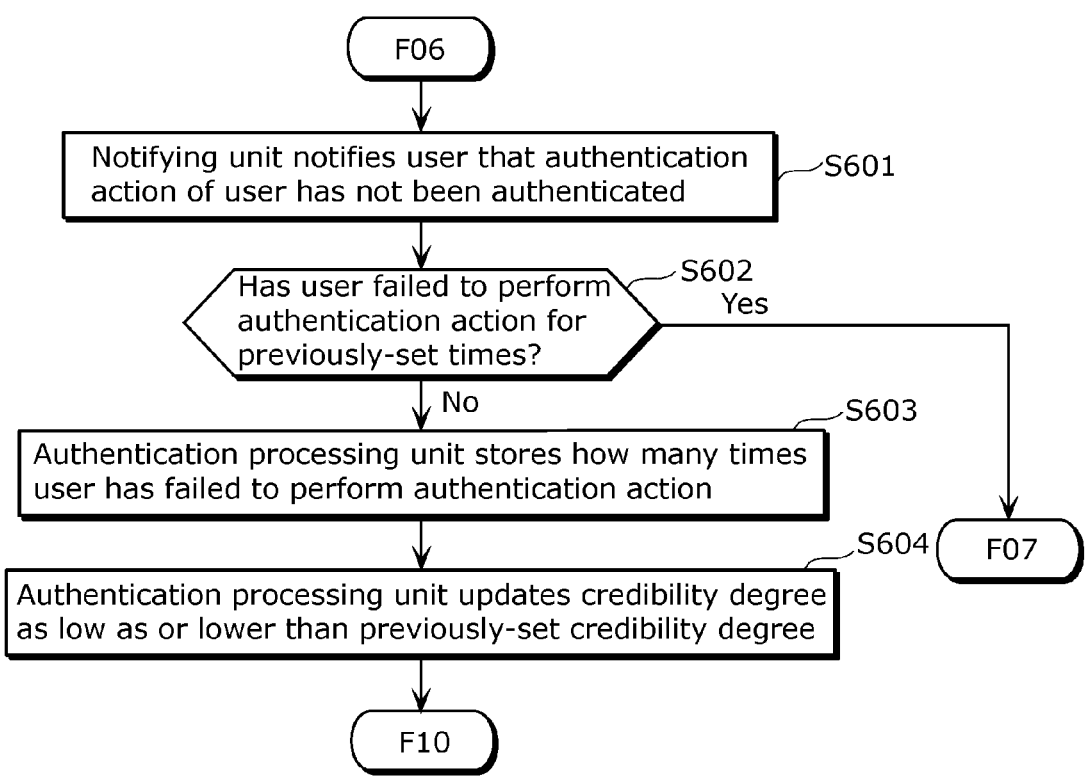
[FIG. 12]
Figure 13:
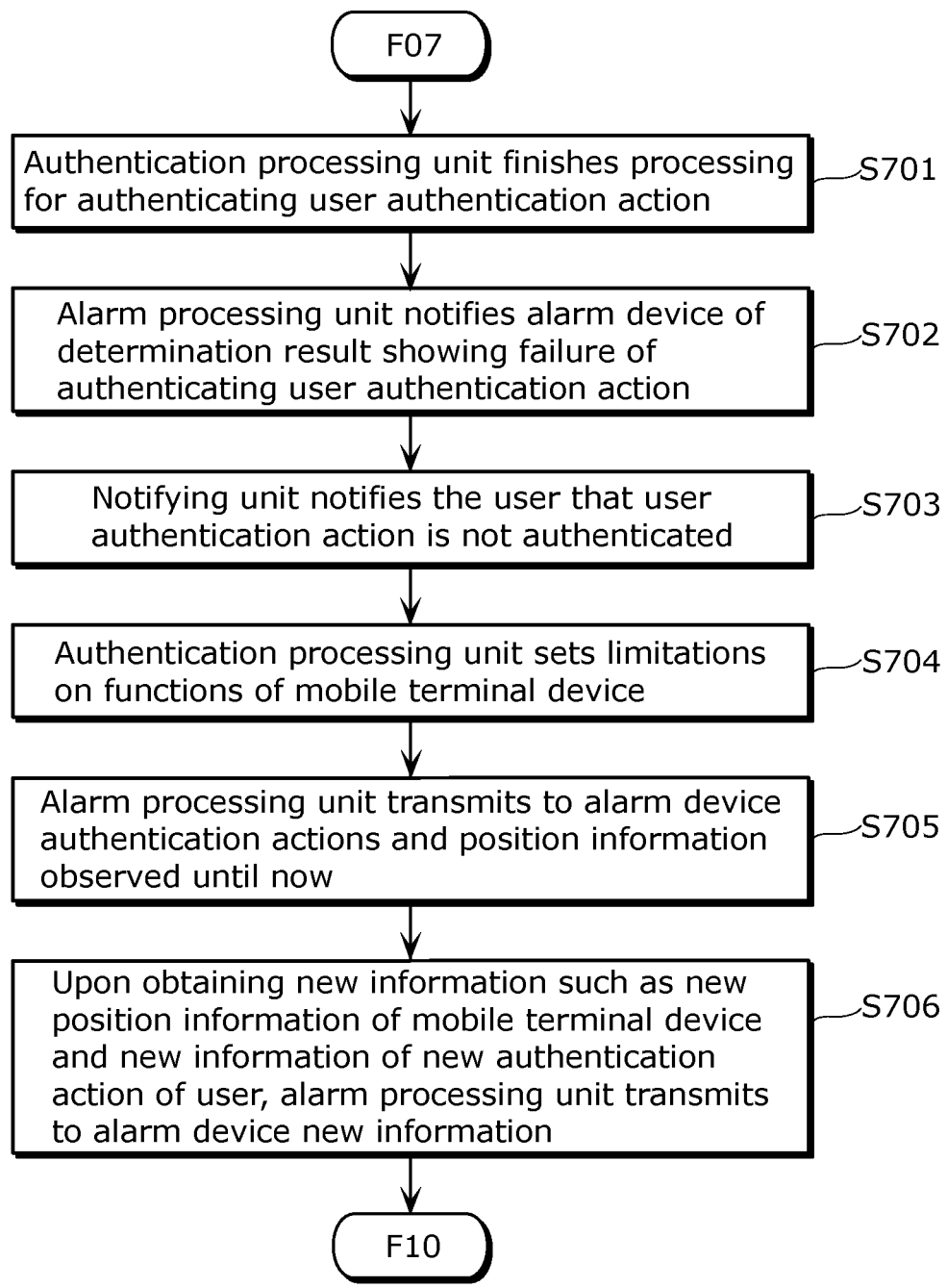
[FIG. 13]
Figure 14:
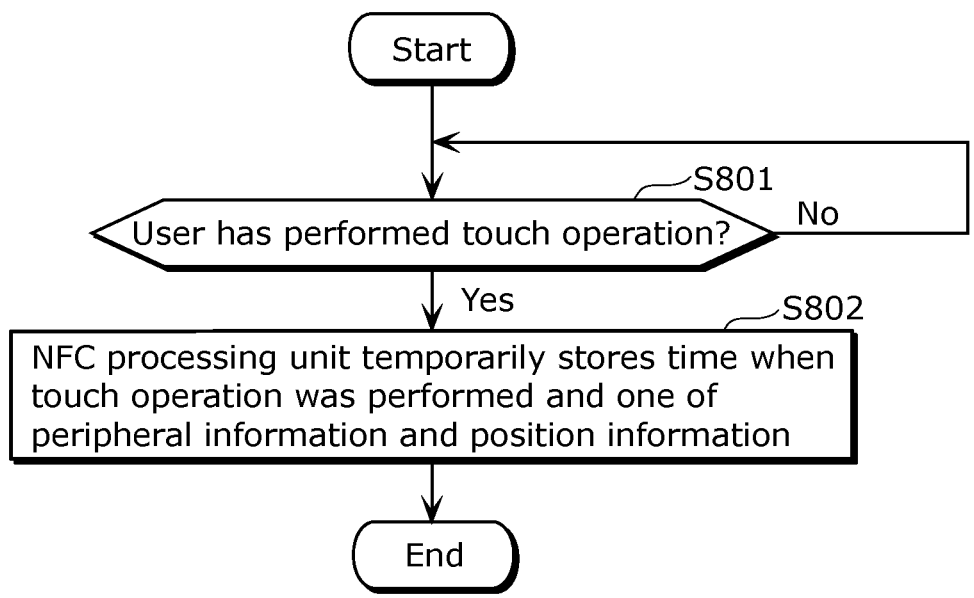
[FIG. 14]
Figure 15:
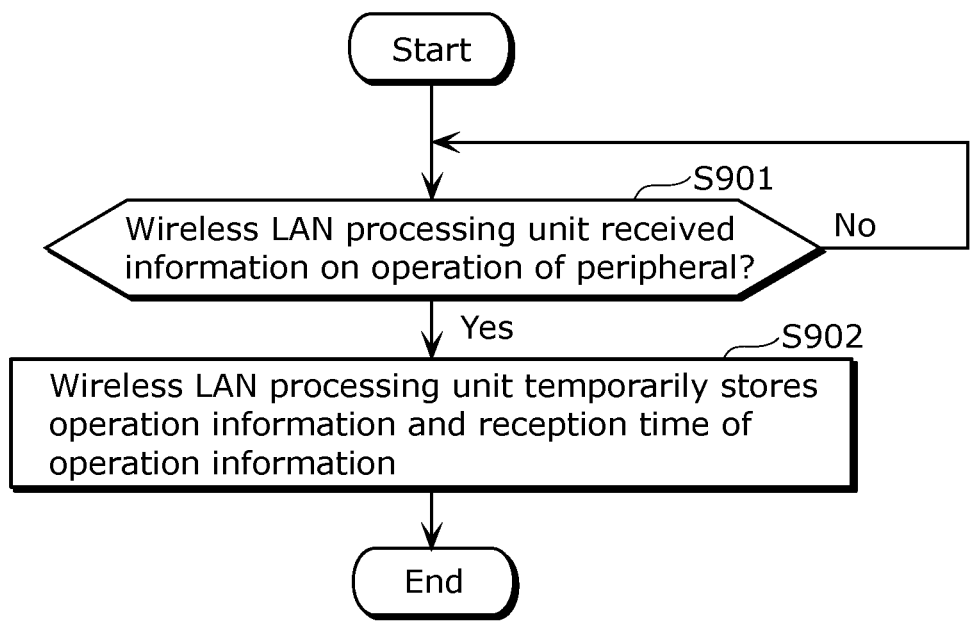
[FIG. 15]

With reference to FIGS. 8 to 15, described next is how the mobile terminal device 100 executes processing for authentication to detect an unauthorized intrusion into the residential area A100. FIGS. 8 to 15 depict flowcharts showing a flow of the processing for authentication on the mobile terminal device 100 according to Embodiment 1. The flowchart in FIG. 14 shows the flow of processing when the NFC processing unit 107 detects a touch operation. The flowchart in FIG. 15 shows the flow of processing when the wireless LAN processing unit 105 obtains user operation information on the peripheral 200. In the case where one of or both the events in FIGS. 14 and 15 occur to the mobile terminal device 100, the processing in both the flowcharts is executed for the event or the events. Hence, the event or the events can simultaneously occur in the processing in the main flowcharts FIGS. 8 to 13 for user authentication. Hence, the processing in FIGS. 14 and 15 and the one in FIGS. 8 to 13 can be executed in parallel.

As the first processing for user authentication, the mobile terminal device 100 is turned on, and an initial set up for the user is executed. This allows the mobile terminal device 100 to start the user authentication.

After the start of the user authentication, the entry determining unit 101 detects whether or not the mobile terminal device 100 enters the residential area A100 (S001). In Step S001, the entry determining unit 101 determines that the mobile terminal device 100 carried by the user has entered the residential area A100, upon detecting at a previously-set position that: the global positioning system processing unit 121 has become unable to receive GPS information from a GPS satellite; the NFC processing unit 107 has processed a touch operation to an NFC device which co-operates with the electronic lock of the front door; or the wireless LAN processing unit 105 in the mobile terminal device 100 has received radio waves emitted from the wireless LAN access point 300 (hereinafter referred to as "entry determination processing").

In the case where the determination of the entry determining unit 101 is "Yes" in Step S001, the authentication processing unit 102 starts the processing for authentication to determine whether or not authentication actions of the user are performed in an authentication order (S002). In contrast, in the case where the determination of the entry determining unit 101 is "No", the processing for authentication goes back to Step S001.

Next, based on acceleration information detected by the acceleration sensor 118 and terminal orientation information derived by the terminal orientation deriving unit 117, the walking characteristics deriving unit 115 derives walking characteristics information of the user carrying the mobile terminal device 100 (S003). Here, the walking characteristics information is accumulated within an immediately-before-entry time period that is set immediately before the user enters the residential area A100.

The complex degree determining unit 114 compares the walking characteristics information derived in Step S003 with walking characteristics information of the authentic user (walking pattern information) previously stored in the walking pattern storage unit 104 (S004). Then, the complex degree determining unit 114 sets a credibility degree as follows (S005): In the case where the complex degree determining unit 114 determines that the user's walking characteristics information derived by the walking characteristics deriving unit 115 is over 80% similar to the previously-determined walking characteristics information of the authentic user, the complex degree determining unit 114 sets the user's credibility degree to 3; in the case where the determination result shows that the user's walking characteristics information is 50% to 80% similar to the previously-determined walking characteristics information of the authentic user, the complex degree determining unit 114 sets the user's credibility degree to 2; and in the case where the determination result shows that the user's walking characteristics information is less than 50% similar to the previously-determined walking characteristics information of the authentic user, the complex degree determining unit 114 sets the user's credibility degree to 2.

The audio producing unit 111 in the notifying unit 109 produces a sound (See FIG. 6) which corresponds to a credibility degree determined by the complex degree determining unit 114 in Step S005 (S006).

Here, in the case where the notifying unit 109 is previously set to notify the displaying unit 110 in the notifying unit 109 of the credibility degree, the displaying unit 110 displays the information of the credibility degree in the form of a graphical user interface (GUI) (S007).

Figure 9:
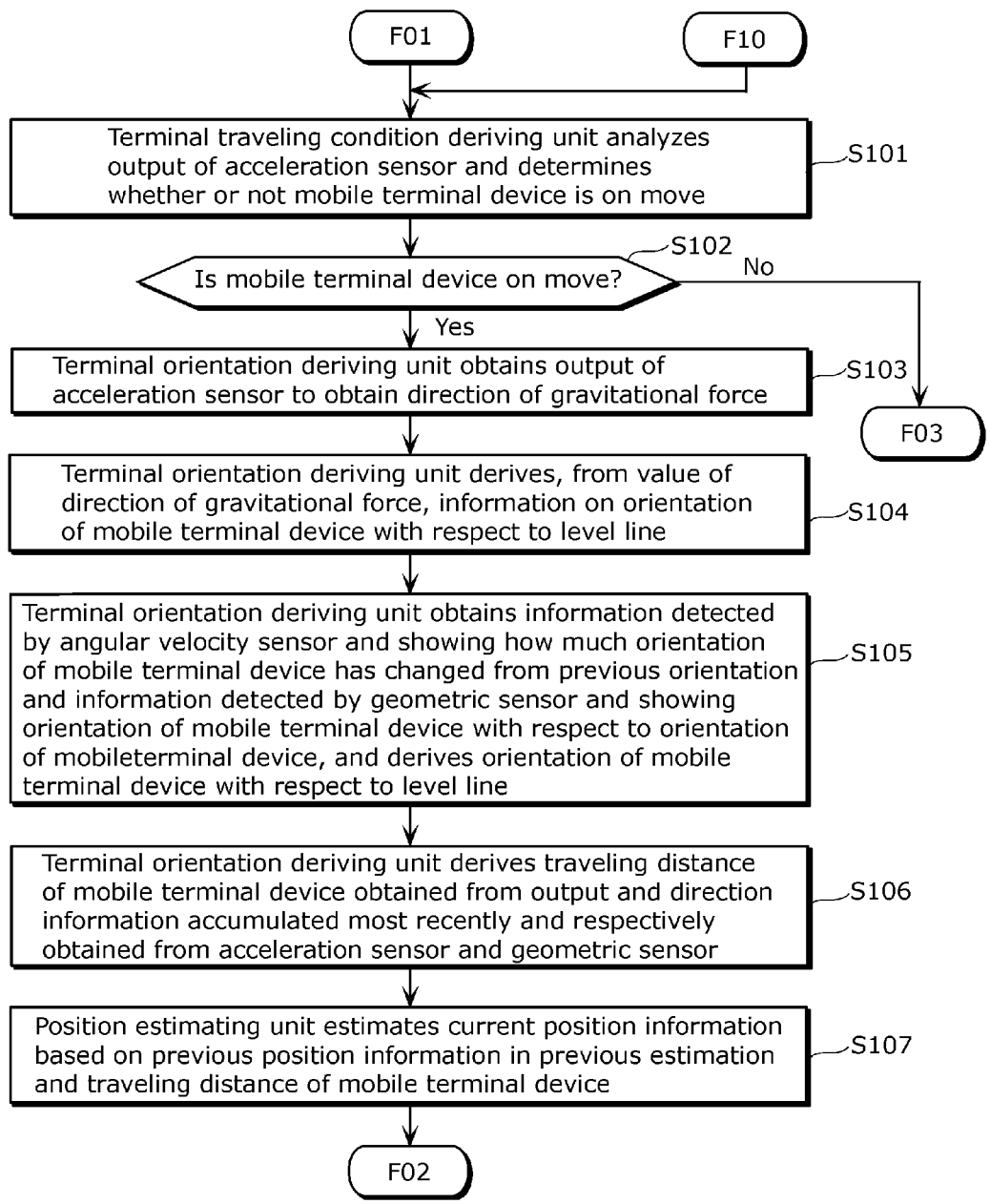
[FIG. 9]

Next, the processing proceeds to Step S101 in FIG. 9. Steps S101 to S107 in FIG. 9 involves deriving a traveling route of the user carrying the mobile terminal device 100, using autonomous navigation.

The terminal traveling condition deriving unit 116 analyzes the acceleration information detected by the acceleration sensor 118, and determines whether or not the mobile terminal device 100 is on the move (S101).

In the case where the determination result in Step S101 shows that the mobile terminal device 100 is on the move (S102: Yes), the processing proceeds to Step S103. In the case where the determination result in Step S101 shows that the mobile terminal device 100 is not on the move (S102: No), the processing proceeds to Step S201.

The terminal orientation deriving unit 117 obtains the acceleration information detected by the acceleration sensor 118 to obtain the direction of gravitational force acting on the mobile terminal device 100 (S103).

The terminal orientation deriving unit 117 drives, from a value of the direction of gravitational force, information on an orientation of the mobile terminal device 100 with respect to the level line (S104).

The terminal orientation deriving unit 117 obtains (i) information detected by the angular velocity sensor 119 and showing how much an orientation of the mobile terminal device 100 has changed from the previous orientation, and (ii) information detected by the geometric sensor 120 and showing an orientation of the mobile terminal device 100 with respect to its orientation. Based on the obtained information, the terminal orientation deriving unit 117 derives the orientation of the mobile terminal device 100 with respect to the level line (S105).

The terminal traveling condition deriving unit 116 derives the traveling distance of the mobile terminal device 100 obtained from the acceleration information and the direction information respectively detected by the acceleration sensor 118 and the geometric sensor 120 (S106). Here, both pieces of the information are accumulated most recently.

The position estimating unit 112 estimates current position information (X2, Y2, Z2) based on the previous position information (X0, Y0, Z0) in the previous estimation and the traveling distance of the mobile terminal device 100 (S107).

Figure 10:
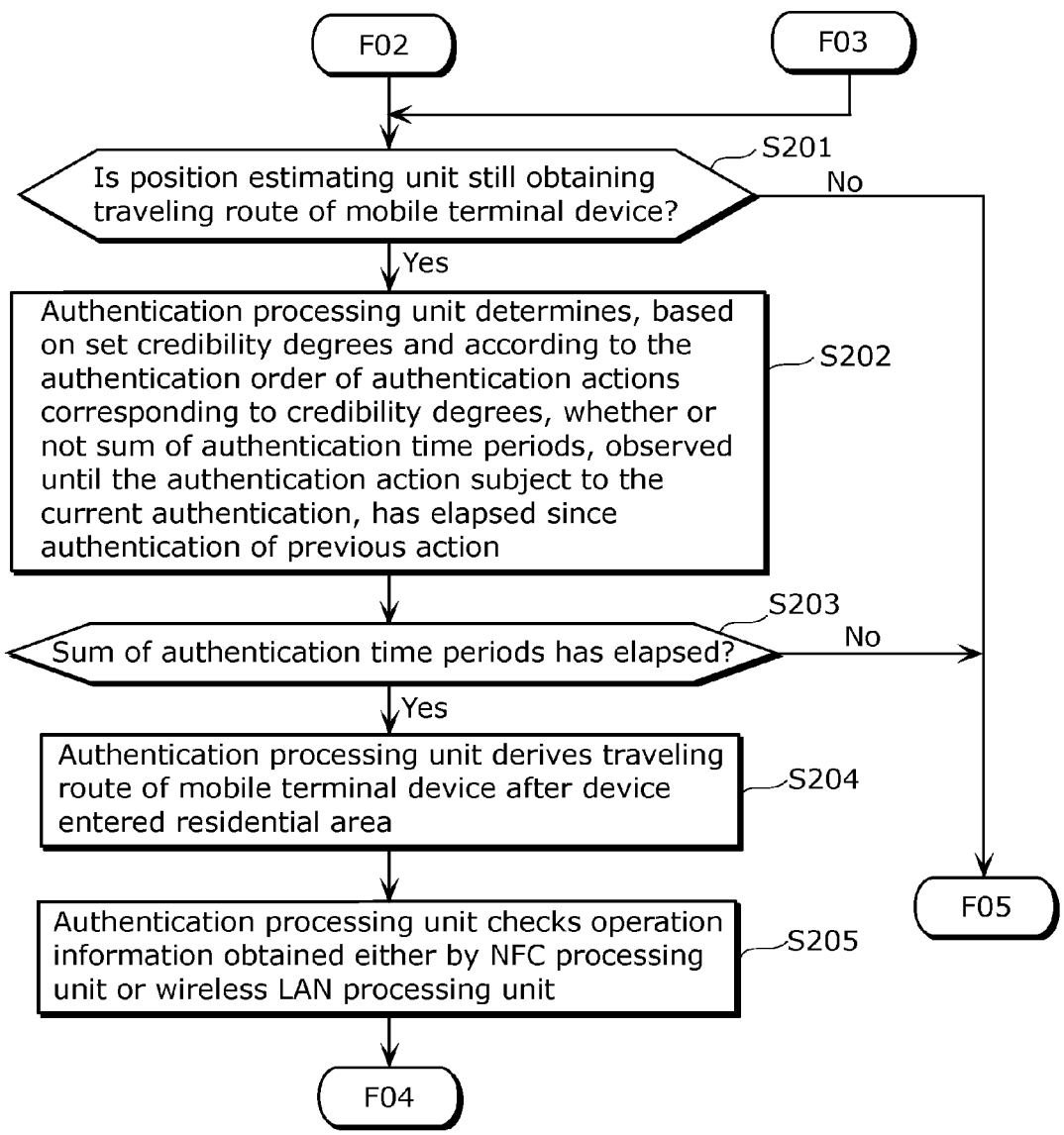
[FIG. 10]

Next, after Step S107, the processing proceeds to Step S201 in FIG. 10. It is noted that even though the determination result in Step S102 in FIG. 9 indicates that the mobile terminal device 100 is not on the move, Step S201 in FIG. 10 is executed after the determination.

The authentication processing unit 102 determines whether or not the position estimating unit 112 is still obtaining the traveling route of the mobile terminal device 100 (S201).

In the case where the authentication processing unit 102 determines that that the position estimating unit 112 is still obtaining the traveling route of the mobile terminal device 100 (S201: Yes), the authentication processing unit 102 determines, based on credibility degrees determined by the complex degree determining unit 114 and according to the authentication order of the authentication actions each corresponding to one of the credibility degrees, whether or not the sum of authentication time periods, observed until the authentication action subject to the current authentication, has elapsed since the authentication of the previous action (S202).

In the case where the authentication processing unit 102 determines that the sum of the authentication time periods has elapsed (S203: Yes), the processing proceeds to the next step—Step S204. In the case where the authentication processing unit 102 determines that the obtainment of the traveling route of the mobile terminal device 100 is canceled (S201: No) or the sum of the authentication time periods has not elapsed yet (S203: No), the user authentication ends.

Next, the authentication processing unit 102 integrates previous coordinate values to derive the traveling route of the mobile terminal device 100 after the mobile terminal device 100 has entered the residential area A100 (S204).

The authentication processing unit 102 checks the operation information obtained either by the NFC processing unit 107 or the wireless LAN processing unit 105 (S205).

Figure 11:
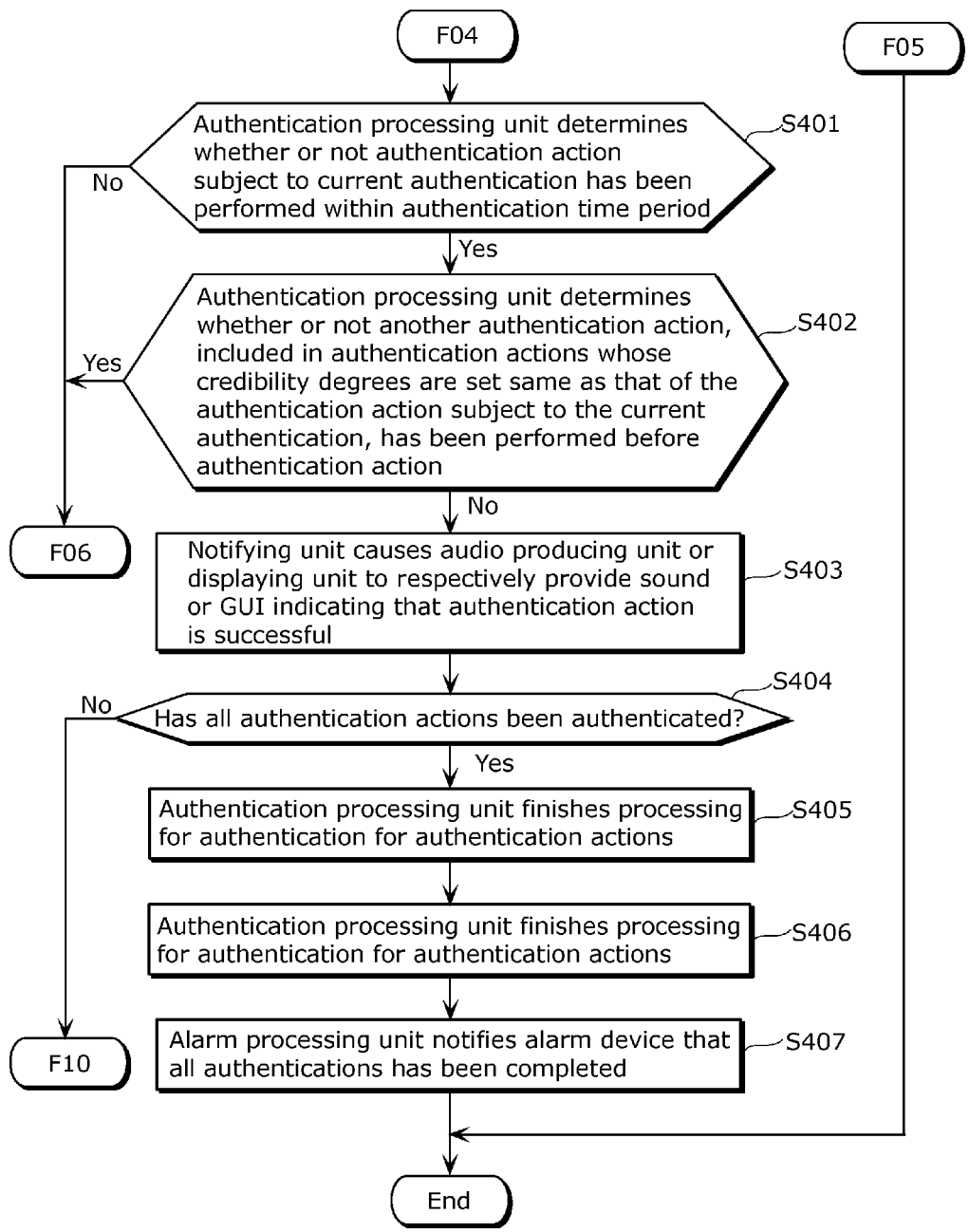
[FIG. 11]

Next, after Step S205, the processing proceeds to Step S401 in FIG. 11.

The authentication processing unit 102 determines whether or not an authentication action subject to the current authentication has been performed within an authentication time period (S401).

In the case where the authentication processing unit 102 determines that the authentication action subject to the current authentication has been performed within the authentication time period (S401: Yes), the authentication processing unit 102 determines whether or not another authentication action, included in the authentication actions whose credibility degrees are set the same as that of the authentication action subject to the current authentication, was performed before the authentication action (S402).

In contrast, in the case where the authentication processing unit 102 determines that the authentic activity subject to the current authentication was not performed within the authentication time period (S401: No), the processing proceeds to Step S601 in FIG. 12.

In the case where the authentication processing unit 102 determines that the other authentication action, included in the authentication actions whose credibility degrees are set the same as that of the authentication action subject to the current authentication, was not performed before the authentication action (S402: No), the notifying unit 109 causes the audio producing unit 111 or the displaying unit 110 to respectively provide a sound or a GUI indicating that the authentication action is successful.

In contrast, in the case where the authentication processing unit 102 determines that the other authentication action, included in the authentication actions whose credibility degrees are set the same as that of the authentication action subject to the current authentication, was performed before the authentication action (S402: Yes), the processing proceeds to Step S601 in FIG. 12.

After Step S403, the authentication processing unit 102 determines whether or not all the authentication actions have been performed by the user (S404). In the case where the authentication processing unit 102 determines that the user has performed all the authentication actions, the authentication processing unit 102 finishes the processing for authentication of the authentication actions (S405). In contrast, in the case where the authentication processing unit 102 determines that the user has not performed all the authentication actions (S404: No), the processing goes back to Step S101.

The authentication processing unit 102 causes the notifying unit 109 to cause the audio producing unit 111 or the displaying unit 110 to respectively provide a sound or a GUI indicating that the authentication has completed, showing that all the authentication actions have been authenticated (S406).

The alarm processing unit 108 notifies the alarm device 400 via the wireless LAN processing unit 105 and the wireless LAN access point 300 that the authentication processing unit 102 has authenticated all the authentication actions (S407), and finishes the authentication of the user.

In the case where the determination result is "No" in Step S401 or "Yes" in Step S402 in FIG. 11, the processing proceeds to Step S601 in FIG. 12.

The notifying unit 109 causes the audio producing unit 111 or the displaying unit 110 to provide, to the user carrying the mobile terminal device 100, a voice or a sound, or a GUI indicating that the authentication action of the user has not been authenticated (S601).

The authentication processing unit 102 determines whether or not the user has failed to perform the authentication action for previously-set times (twice in Embodiment 1) (S602).

In the case where the user has failed to perform the authentication action for the previously-set times (S602: Yes), the process proceeds to Step S701 in FIG. 13. In contrast, in the case where the user has failed to perform the authentication action fewer than the previously-set times (S602: No), the authentication processing unit 102 stores how many times the user has failed to perform the authentication action (S603).

Then, the authentication processing unit 102 updates the credibility degree as low as or lower (credibility degree of 1, for example) than the credibility degree set by the complex degree determining unit 114 (S604). The processing goes back to Step S101 to repeat the processing for authentication.

In the case where the determination result is "Yes" in Step S602 in FIG. 12, the processing proceeds to Step S701 in FIG. 13.

The authentication processing unit 102 finishes the processing for authenticating the user authentication action (S701).

The alarm processing unit 108 notifies the alarm device 400 via the wireless LAN processing unit 105 and the wireless LAN access point 300 that the authentication processing unit 102 has determined its failure to authenticate the authentication action of the user (S702).

The notifying unit 109 causes the audio producing unit 111 or the displaying unit 110 to provide a voice or a sound, or a GUI indicating that the authentication action of the user has not been authenticated (S703).

The authentication processing unit 102 sets limitations on the functions of the mobile terminal device 100 (S704). The limitations on the functions include disabling a conversation feature of the mobile terminal device 100 and denying an access to information sources which the mobile terminal device 100 can access.

The alarm processing unit 108 transmits to the alarm device 400 via the wireless LAN processing unit 105 and the wireless LAN access point 300 the authentication actions performed by the user and the position information of the mobile terminal device 100 until now (S705).

Upon obtaining new information such as new position information of the mobile terminal device 100 and new information of a new authentication action of the user, the alarm processing unit 108 sets the alarm device 400 so that the alarm device 400 transmits the new information (S706). Then, the processing goes back to Step S101 in FIG. 9 to monitor the activity of the user.

When the NFC processing unit 107 detects a touch operation, the processing in FIGS. 8 to 13 is executed apart from the processing in the flowchart of FIG. 13.

The NFC processing unit 107 determines whether or not the user has performed the touch operation with the mobile terminal device 100 to an RFID tag provided to the peripheral 200 or to the a previously-set position in the residential area A100 (S801).

In the case where the determination result indicates that the user has performed the touch operation with the mobile terminal device 100 on the RFID tag (S801: Yes), the NFC processing unit 107 temporarily stores the time when the touch operation was performed and one of the peripheral information indicating the peripheral 200 and the position information indicating the previously-set position within the residential area A100 (S802). Here, the peripheral information and the position information are associated with the RFID tag. Then, the NFC processing unit 107 finishes the processing.

When the wireless LAN processing unit 105 detects an operation of the peripheral 200 by the user, the processing in FIGS. 8 to 13 is executed apart from the processing in the flowchart of FIG. 13.

When the user operates the peripheral 200, the wireless LAN processing unit 105 determines whether or not the wireless LAN processing unit 105 has received, via the wireless LAN access point 300 operation information indicating the operation (S901).

In the case where the determination result indicates that the wireless LAN processing unit 105 has received the operation information via the wireless LAN, the wireless LAN processing unit 105 temporarily stores the operation information and the reception time of the operation information (S902), and finishes the processing.

In the mobile terminal device 100 according to Embodiment 1, the authentication processing unit 102 executes processing for authentication to a user carrying the mobile terminal device 100 by determining whether or not the user has performed the previously-set authentication actions according to the authentication order. Then, in the case where the result of the processing for authentication executed by the authentication processing unit 102 is a failure; that is the case where the activities which the user has performed after he or she entered the residential area A100 that is the target area do not follow a previously-set order of authentication actions, the alarm processing unit 108 provides a notification of an authentication failure indicating the failure of the authentication.

Thus, even though an illegitimate user maliciously obtains the mobile terminal device 100, the authentication actions performed after the user has entered the residential area A100 make it possible to determine whether or not the user is the legitimate owner of the mobile terminal device 100. In the case where the result of the determination shows a failure of authentication, the mobile terminal device 100 executes the alarm processing and successfully assures the security in the house.

It is noted that Embodiment 1 involves multiple authentication actions. The mobile terminal device 100 determines whether or not the multiple authentication actions have been performed in an authentication order to determine whether or not a user who has entered the residential area A100 is the legitimate one. Instead of determining the order of the multiple authentication actions, the mobile terminal device 100 may determine whether or not the user has performed, for example, a single authentication action immediately after he or she entered the residential area A100 to determine the user is the legitimate one.

Figure 8:
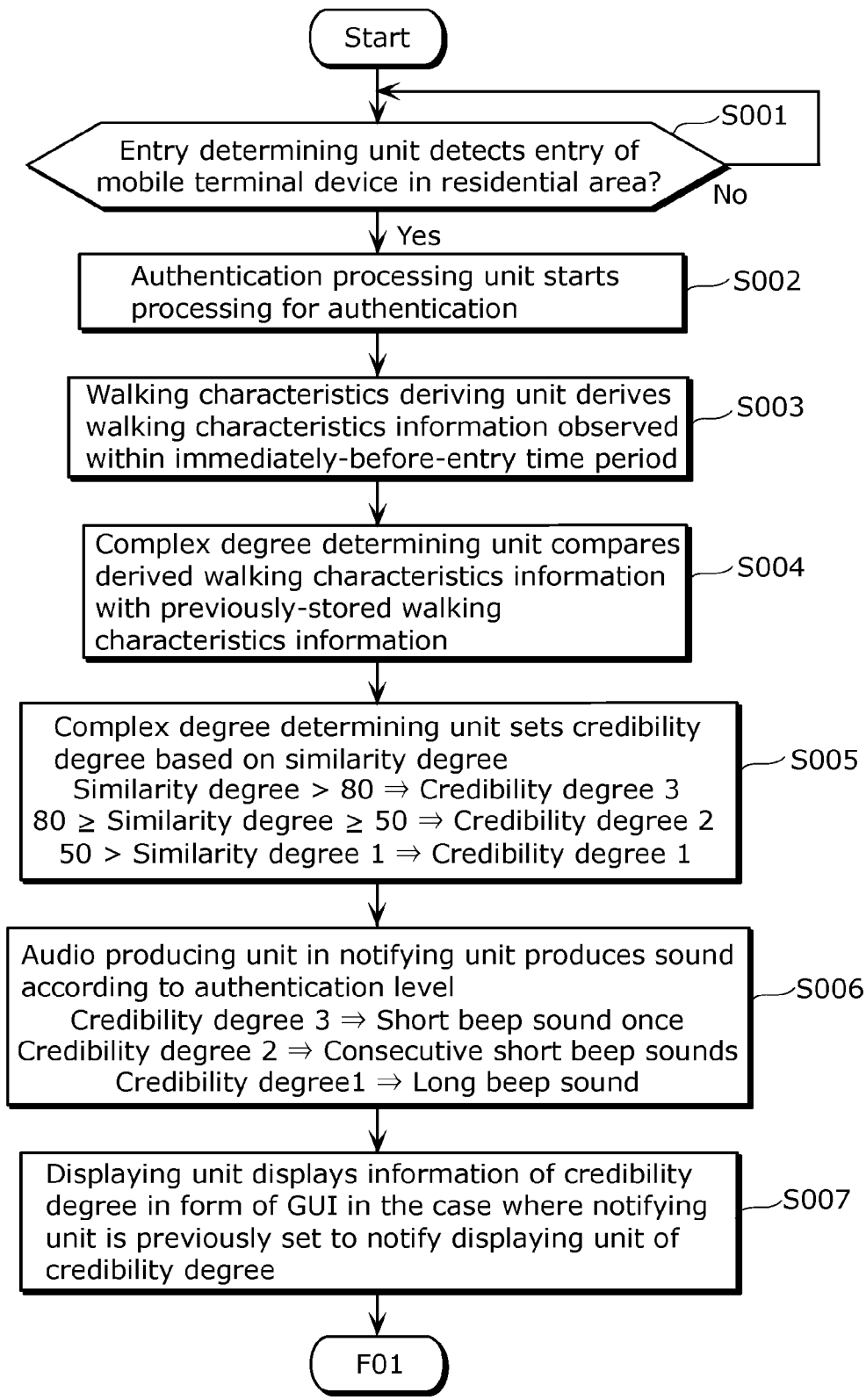
[FIG. 8]

In Step S001 of the flowchart in FIG. 8 for the user authentication according to Embodiment 1, the entry determining unit 101 determines whether or not the mobile terminal device 100 that the user carries has entered the residential area A100 by detecting one of three events at a previously-set position: The global positioning system processing unit 121 has become unable to receive GPS information from a GPS satellite; the NFC processing unit 107 has processed a touch operation to an NFC device which co-operates with the electronic lock of the front door; and the wireless LAN processing unit 105 in the mobile terminal device 100 has received radio waves emitted from the wireless LAN access point 300. However, the entry determining unit 101 does not have to detect all kinds of the three events. Instead, the entry determining unit 101 may detect only one kind of the events. In other words, the entry determining unit 101 may detect at least one of the events at a previously-set position: The global positioning system processing unit 121 has become unable to receive GPS information from a GPS satellite; the NFC processing unit 107 has processed a touch operation to an NFC device which co-operates with the electronic lock of the front door; and the wireless LAN processing unit 105 in the mobile terminal device 100 has received radio waves emitted from the wireless LAN access point 300.

In Steps S003 to S005 of the flowchart in FIG. 8 for the user authentication after the determination by the entry determining unit 101 of the entry of the mobile terminal device 100 into the residential area A100 (Step S001) according to Embodiment 1, the walking characteristics deriving unit 115 derives walking characteristics information of the user, and the complex degree determining unit 114 determines a credibility degree of the user based on previously-set walking characteristics information. Such processing should not be defined to be executed after the entry determination by the entry determining unit 101; instead, the processing may always be executed regardless of whether or not the entry determining unit 101 executes the entry determination. Here, the processing in Steps S006 to S007 may be executed when the complex degree determining unit 114 either determines a credibility degree of the user or updates the credibility degree of the user to another credibility degree which differs from the previously-determined one.

In Embodiment 1, the user authentication ends after all the authentication actions have been authenticated. Instead, the processing may go back to Step S101 to continue monitoring the status of the mobile terminal device 100.

[Embodiment 2]

Figure 16:
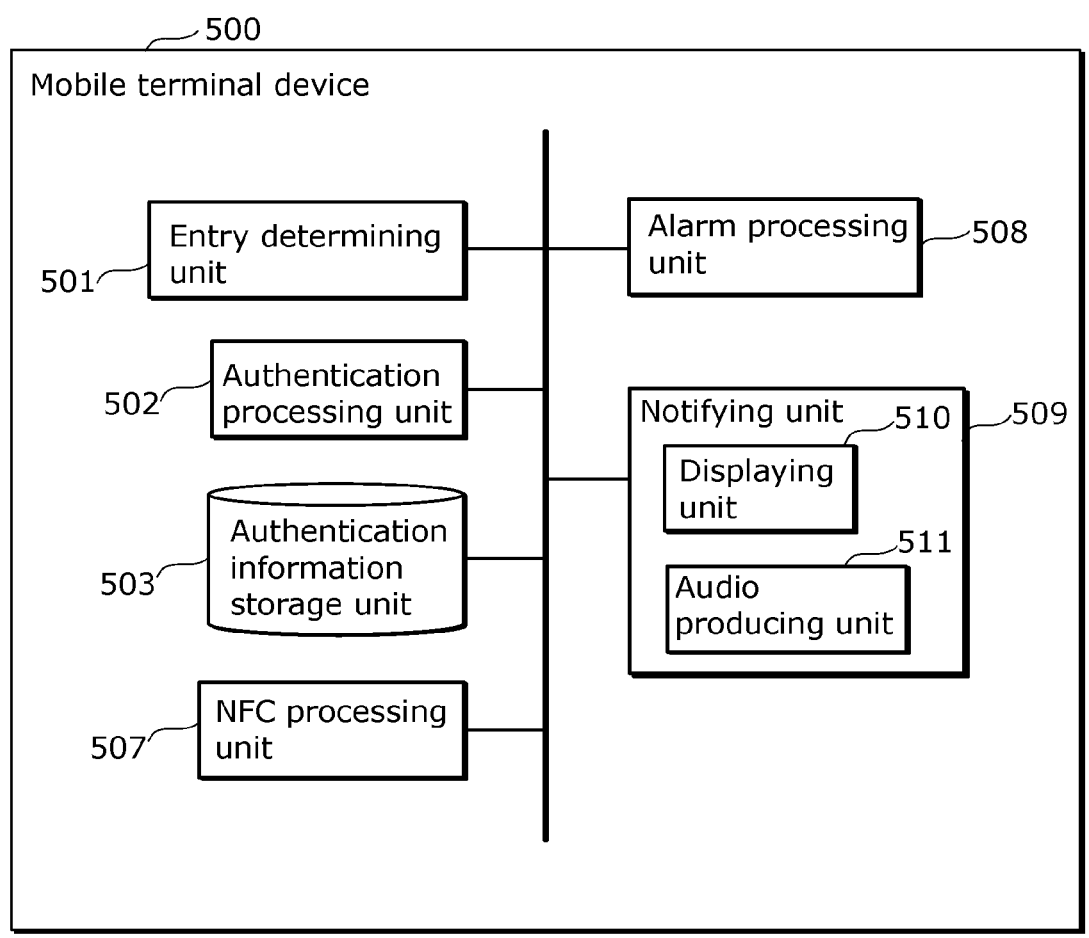
[FIG. 16]

FIG. 16 depicts a functional block showing how a mobile terminal device 500 according to Embodiment 2 of the present invention executes unauthorized intrusion detection processing. As shown in FIG. 16, the mobile terminal device 500 according to Embodiment 2 of the present invention includes an entry determining unit 501, an authentication processing unit 502, an authentication information storage unit 503, an NFC processing unit 507, an alarm processing unit 508, and a notifying unit 509 including a displaying unit 510 and an audio producing unit 511. The mobile terminal device 500 differs from the mobile terminal device 100 according to Embodiment 1 in that the mobile terminal device 500 does not include the walking pattern storage unit 104, the wireless LAN processing unit 105, the peripheral information receiving unit 106, the position estimating unit 112, the traveling route deriving unit 113, the complex degree determining unit 114, the walking characteristics deriving unit 115, the terminal traveling condition deriving unit 116, the acceleration sensor 118, the angular velocity sensor 119, the geometric sensor 120, and the global positioning system processing unit 121. The other constituent elements of the mobile terminal device 500 are similar to those in the mobile terminal device 100. The constituent features sharing the same names between the mobile terminal devices 100 and 500 are the same in function, and thus the details thereof shall be omitted.

Having such a structure, the mobile terminal device 500 can at least detect an authentication action when the NFC processing unit 507 receives a touch operation by a user to an RFID tag previously-provided to a peripheral and the residential area A100. In other words, the aim of the present invention can be achieved with such a minimum structure. Consequently, unauthorized intrusion is successfully detected without complex equipment.

Moreover, the mobile terminal device 500 obtains an authentication action through the NFC processing unit 507 detecting a touch operation on a previously-attached RFID tag provided to a peripheral and the residential area A100. Instead of the NFC processing unit 507, the mobile terminal device 500 may adopt either a wireless LAN processing unit to obtain the information on an operation performed by the user to a peripheral in order to obtain an authentication action, or various processing units and sensors to utilize autonomous navigation techniques to obtain the information on a route which the user has taken. The combination of the processing units and the sensors may be appropriately changed as necessary.

[Other Embodiments]

Each of the mobile terminal device 100 in Embodiment 1 and the mobile terminal device 500 in Embodiment 2 causes the authentication information storage unit 103 to store authentication information showing multiple authentication actions and an authentication order indicating the performing order of the authentication actions. Then, between the entry of the mobile terminal device 100 or the mobile terminal device 500 and the elapse of a predetermined time period, the authentication processing unit 102 executes processing for authenticating the user by determining whether or not the user performs the authentication actions in the authentication orders, based on the comparison between the activities performed by the user and the authentication actions shown in the authentication information. In other words, the authentication processing unit 102 executes the processing for authentication of the user based on authentication actions and the authentication order of the authentication actions. The authentication processing unit 102 may also execute the processing for authentication based only on a single authentication action, instead of multiple authentication actions.

In this case, the authentication information storage unit 103 stores authentication information showing a single authentication action to be performed for the authentication by the user carrying the mobile terminal device 100 or the mobile terminal device 500. Then, the authentication processing unit 102 may execute the processing for the authentication of the user by determining, based on the comparison between an activity performed by the user and the authentication action shown in the authentication information, whether or not the user has performed the authentication action between the determination by the entry determining unit 101 of the entry of the mobile terminal device 100 or the mobile terminal device 500 and the elapse of a predetermined time period.

Specifically, for example, the authentication information storage unit 103 may store the following one of the activities as the authentication action when the user enters a target area;

that is the front door, with the mobile terminal device 100 or the mobile terminal device 500: The user shakes the mobile terminal device 100 or the mobile terminal device 500, touches with the mobile terminal device a tag provided to a predetermined position at the front door, or provides a predetermined input through its input button or its touch sensor. In such a case, the authentication processing unit 102 executes the processing for the authentication of the user by determining whether or not one of the activities has been performed between the entry of the user into the residential area A100 and the elapse of the predetermined time period.

Part or all of the constituent elements constituting the mobile terminal device 100 according to Embodiment 1 and the mobile terminal device 500 according to Embodiment 2 may be configured from a single System-LSI (Large-Scale Integration). For example, the mobile terminal device 100 may include a system LSI having the entry determining unit 101, the authentication processing unit 102, the authentication information storage unit 103, the walking pattern storage unit 104, the wireless LAN processing unit 105, the peripheral information receiving unit 106, the NFC processing unit 107, the alarm processing unit 108, the notifying unit 109, the position estimating unit 112, the complex degree determining unit 114, the walking characteristics deriving unit 115, the terminal traveling condition deriving unit 116, and the terminal orientation deriving unit 117.

The System-LSI is a super-multi-function LSI manufactured by integrating constituent units on one chip. Specifically, the System-LSI is a computer system including a microprocessor, a ROM, a random access memory (RAM), or by means of a similar device. The ROM stores a computer program. The System-LSI performs its functions through the microprocessor's operation according to the computer program.

Furthermore, here, System-LSI is mentioned but there are instances where, due to a difference in the degree of integration, the designations IC, LSI, super LSI, and ultra LSI are used. Furthermore, the means for circuit integration is not limited to the LSI, and implementation in the form of a dedicated circuit or a general-purpose processor is also available. In addition, it is also acceptable to use a Field Programmable Gate Array (FPGA) that is programmable after the LSI has been manufactured, and a reconfigurable processor in which connections and settings of circuit cells within the LSI are reconfigurable.

Furthermore, if an integrated circuit technology that replaces the LSI appears thorough the progress in the semiconductor technology or an other derived technology, that technology can naturally be used to carry out integration of the constituent elements. Biotechnology can be applied to the integrated circuit technology.

It is noted that, in the above embodiment, each of the constituent elements may be implemented in a form of dedicated hardware; instead, the constitutional elements may be implemented through execution of a software program suitable to for each constitutional element. Each of the constitutional elements may be implemented as a program executing unit, such as a CPU and a processor, reads out and executes software program recorded on a recording medium including a hard disc or a semiconductor memory. Here, the program below may be the software that works as the mobile terminal device according to each of the embodiments.

In other words, the program executes an authentication method for authenticating a user who carries a mobile terminal device. The method includes: determining entry of the mobile terminal device in a target area; executing processing for authentication of the user by determining whether or not the user performs the authentication action between when the entry determining unit determines that the mobile terminal device enters the target area and when a predetermined time elapses, the determination being made based on a comparison between an activity performed by the user and the authentication action indicated in the authentication information; and indicating a failure of the authentication when a result of the processing for the authentication is the failure.

The present invention can be implemented not only as a mobile terminal device including the above characteristic processing units but also as an authentication processing method utilizing the characteristic processing units of the mobile terminal device in the form of steps. Moreover, each of the characteristic steps included in the authentication processing method may be implemented in the form of a computer program to cause a computer to execute the steps. As a matter of course, the program may be distributed via a recording medium such as a CD-ROM and a transmission medium such as the Internet.

INDUSTRIAL APPLICABILITY

The mobile terminal device according to an implementation of the present invention is effective as a mobile terminal device to fully detect unauthorized intrusion without depending on a monitoring unit, such as a camera.

REFERENCE SIGNS LIST

1 Authentication system
100 Mobile terminal device
101 Entry determining unit
102 Authentication processing unit
103 Authentication information storage unit
104 Walking pattern storage unit
105 Wireless LAN processing unit
106 Peripheral information receiving unit
107 NFC processing unit
108 Alarm processing unit
109 Notifying unit
110 Displaying unit
111 Audio producing unit
112 Position estimating unit
113 Traveling route deriving unit
114 Complex degree determining unit
115 Walking characteristics deriving unit
116 Terminal traveling condition deriving unit
117 Terminal orientation deriving unit
118 Acceleration sensor
119 Angular velocity sensor
120 Geometric sensor
121 Global positioning system processing unit
122 Operation receiving unit
200 Peripheral
201 Wireless LAN processing unit
202 Storage unit
203 User IF
204 NFC processing unit
210 Microwave
220 Refrigerator
230 TV
300 Wireless LAN access point
400 Alarm device
500 Mobile terminal device
501 Entry determining unit
502 Authentication processing unit
503 Authentication information storage unit 507 NFC processing unit
508 Alarm processing unit
509 Notifying unit
510 Displaying unit
511 Audio producing unit
A100 Residential are

The invention claimed is:

1. A mobile terminal device which a user carries, the mobile terminal device comprising:
an entry determining unit configured to determine entry of the mobile terminal device in a target area;
an authentication information storage unit configured to store authentication information which indicates an authentication action performed for authentication by the user carrying the mobile terminal device;
an authentication processing unit configured to execute processing for authentication of the user by determining whether or not the user performs the authentication action between when the entry determining unit determines that the mobile terminal device enters the target area and when a predetermined time elapses, the determination being made based on a comparison between an activity performed by the user and the authentication action indicated in the authentication information; and
an alarm processing unit configured to, when a result of the processing for the authentication is a failure, indicate the failure of the authentication,
wherein the authentication information storage unit is configured to store the authentication information indicating, as the authentication action, a touch operation by the user touching with the mobile terminal device a tag provided to a previously-set position within the target area or to a peripheral,
the mobile terminal device further comprises
a near field communication (NFC) processing unit configured to, when the user performs the touch operation, receive position information indicating a predetermined position within the target area or peripheral information indicating the peripheral, the position information and the peripheral information being associated with the tag, and
the authentication processing unit is configured to, by determining that the touch operation has been performed by the user, execute the processing for the authentication of the authentication action indicated with the touch operation, the determination being made based on the position information or the peripheral information received by the NFC processing unit, and the touch operation being a touch with the mobile terminal device the tag provided either to the predetermined position indicated in the position information or to the peripheral indicated in the peripheral information.

2. The mobile terminal device according to claim 1, wherein the authentication information storage unit is configured to store the authentication information indicating an operation by the user of a peripheral as the authentication action,
the NFC processing unit is configured to receive most-recent operation information, along with the peripheral information, from the peripheral, the most-recent operation information indicating a most-recent operation by the user of the peripheral before the touch operation, and
the authentication processing unit is configured to execute the processing for the authentication of an authentication action indicated in the most-recent operation information and defined as a most-recent authentication action before the touch operation.

3. A mobile terminal device which a user carries, the mobile terminal device comprising:
an entry determining unit configured to determine entry of the mobile terminal device in a target area;
an authentication information storage unit configured to store authentication information which indicates an authentication action performed for authentication by the user carrying the mobile terminal device;
an authentication processing unit configured to execute processing for authentication of the user by determining whether or not the user performs the authentication action between when the entry determining unit determines that the mobile terminal device enters the target area and when a predetermined time elapses, the determination being made based on a comparison between an activity performed by the user and the authentication action indicated in the authentication information;
an alarm processing unit configured to, when a result of the processing for the authentication is a failure, indicate the failure of the authentication;
an acceleration sensor;
an angular velocity sensor;
a geometric sensor;
a terminal orientation deriving unit configured to derive terminal orientation information, indicating an orientation of the mobile terminal device, from acceleration information detected by the acceleration sensor, angular velocity information detected by the angular velocity sensor, and geometric information detected by the geometric sensor;
a terminal traveling condition deriving unit configured to derive terminal traveling condition information, indicating a traveling distance and a traveling direction of the mobile terminal device, from the acceleration information detected by the acceleration sensor and the terminal orientation information derived by the terminal orientation deriving unit;
a position estimating unit configured to estimate current position information indicating a current position of the mobile terminal device, based on the terminal traveling condition information and previous position information indicating a position of the mobile terminal device in a previous estimation; and
a traveling route deriving unit configured to derive traveling route information, indicating a route which the user carrying the mobile terminal device travels, from the previous position information and the current position information estimated by the position estimating unit,
wherein the authentication action includes the traveling route information, and
the authentication processing unit is configured to execute the processing for the authentication of the authentication action indicated in the traveling route information.

4. A mobile terminal device which a user carries, the mobile terminal device comprising:
an entry determining unit configured to determine entry of the mobile terminal device in a target area;
an authentication information storage unit configured to store authentication information which indicates an authentication action performed for authentication by the user carrying the mobile terminal device;
an authentication processing unit configured to execute processing for authentication of the user by determining whether or not the user performs the authentication action between when the entry determining unit determines that the mobile terminal device enters the target area and when a predetermined time elapses, the determination being made based on a comparison between an activity performed by the user and the authentication action indicated in the authentication information;

an alarm processing unit configured to, when a result of the processing for the authentication is a failure, indicate the failure of the authentication; and an acceleration sensor;

a walking characteristics deriving unit configured to derive walking characteristics information, indicating walking characteristics of the user, from acceleration information detected by the acceleration sensor;

a complex degree determining unit configured to determine a complex degree of the processing for the authentication performed by the authentication processing unit based on the walking characteristics information derived by the walking characteristics deriving unit and found within an immediately-before-entry time period which is set immediately before the user enters the target area; and a notifying unit configured to aurally or visually notify the user of complex degree information corresponding to the complex degree determined by the complex degree determining unit, wherein the authentication information storage unit is configured to previously stores the authentication information corresponding to the complex degree, of the processing for the authentication, determined by the complex degree determining unit, and the authentication processing unit is configure to execute the processing for the authentication according to the authentication information corresponding to the complex degree, of the processing for the authentication, determined by the complex degree determining unit.

5. An authentication system comprising:

a peripheral which is previously set within a target area; and a mobile terminal device which is carried by a user and receives information from the peripheral, wherein the peripheral includes:
  a tag which includes at least peripheral information indicating the peripheral; and
  a storage unit configured to store most-recent operation information indicating a most-recent operation performed by the user of the peripheral before a touch operation performed by the user touching the tag with the mobile terminal device, and the mobile terminal device includes:
  an entry determining unit configured to determine entry of the mobile terminal device in a target area;
  an authentication information storage unit configured to store authentication information which indicates (i) authentication actions performed for authentication by the user carrying the mobile terminal device, and (ii) an authentication order indicating an order of the authentication actions to be performed;
  an NFC processing unit configured to, when the user performs the touch operation, receive peripheral information included in the tag and the most-recent operation information stored in the storage unit;
  an authentication processing unit configured to execute processing for authentication of the user by (i) determining touch operations, including the touch operation, based on the peripheral information received from the NFC processing unit, and (ii) determining whether or not the user performs, in an authentication order and between when the entry determining unit determines that the mobile terminal device enters the target area and when a predetermined time elapses, the authentication actions based on a comparison between (i) authentication actions indicated with the touch operations and authentication actions indicated in the most-recent operation information, and (ii) authentication information, the touch operation being a touch with the mobile terminal device the tag provided to the peripheral indicated in the peripheral information; and
  an alarm processing unit configured to, when a result of the processing for the authentication is a failure, indicate the failure of the authentication.

6. A mobile terminal device which a user carries, the mobile terminal device comprising:

a processor; and a non-transitory memory having stored thereon executable instructions, which when executed by the processor, cause the processor to perform:
  determining entry of the mobile terminal device in a target area, the mobile terminal device storing authentication information which indicates an authentication action performed for authentication by the user carrying the mobile terminal device;
  executing processing for authentication of the user by determining whether or not the user has performed the authentication action between when the mobile terminal device is determined to enter the target area and when a predetermined time elapses, the determination being made based on a comparison between an activity performed by the user and the authentication action indicated in the authentication information; and
  indicating, when a result of the processing for the authentication is a failure, indicate the failure of the authentication, wherein the authentication information indicates, as the authentication action, a touch operation by the user touching with the mobile terminal device a tag provided to a previously-set position within the target area or to a peripheral, wherein the executable instructions, when executed by the processor, further cause the processor to perform
  receiving, when the user performs the touch operation, receive position information indicating a predetermined position within the target area or peripheral information indicating the peripheral, the position information and the peripheral information being associated with the tag, and wherein the processing for the authentication of the authentication action indicated with the touch operation is executed by determining that the touch operation has been performed by the user, the determination being made based on the received position information or the received peripheral information, and the touch operation being a touch with the mobile terminal device the tag provided either to the predetermined position indicated in the received position information or to the peripheral indicated in the received peripheral information.

* * * * *